United States Patent
Ikegami

[11] Patent Number: 6,100,999
[45] Date of Patent: Aug. 8, 2000

[54] METHOD FOR PREDICTING COLOR TRANSFER CHARACTERISTICS

[75] Inventor: Hiroaki Ikegami, Ashigarakami-gun, Japan

[73] Assignee: Fuji Xerox Co., Ltd., Tokyo, Japan

[21] Appl. No.: 09/006,826

[22] Filed: Jan. 14, 1998

[30] Foreign Application Priority Data

Jan. 14, 1997 [JP] Japan .................................. 9-004949

[51] Int. Cl.$^7$ .................................................. B41B 15/00
[52] U.S. Cl. ............................ 358/1.9; 358/518; 382/167
[58] Field of Search .................................. 358/501, 504, 358/518, 523, 525, 1.9; 382/162, 167; 702/194, 196, 199; 348/394, 650, 651

[56] References Cited

U.S. PATENT DOCUMENTS

| | | | |
|---|---|---|---|
| 5,448,379 | 9/1995 | Ishihara et al. | 358/518 |
| 5,471,324 | 11/1995 | Rolleston | 358/518 |
| 5,528,386 | 6/1996 | Rolleston et al. | 358/522 |
| 5,631,979 | 5/1997 | Cok | 382/263 |
| 5,734,801 | 3/1998 | Noguchi et al. | 395/109 |
| 5,748,858 | 5/1998 | Ohtsuka et al. | 395/109 |
| 5,960,110 | 9/1999 | Usami | 382/167 |
| 5,982,949 | 11/1999 | Ohtsuka | 382/276 |
| 6,005,970 | 12/1999 | Ohneda et al. | 382/167 |
| 6,014,457 | 1/2000 | Kubo et al. | 382/167 |
| 6,016,168 | 1/2000 | Kim | 348/661 |

FOREIGN PATENT DOCUMENTS

| | | |
|---|---|---|
| 2-226870 | 9/1990 | Japan . |
| 2-289367 | 11/1990 | Japan . |
| 5-18305 | 3/1993 | Japan . |
| 7-87347 | 3/1995 | Japan . |

OTHER PUBLICATIONS

Kazumasa MURAI et al., "An Accurate Color Transformation Algorithm based on Flexible GCR", Dec. 25, 1995, pps. 125–129.

*Primary Examiner*—Kimberly A. Williams
*Assistant Examiner*—Derrick Fields
*Attorney, Agent, or Firm*—Oliff & Berridge, PLC

[57] ABSTRACT

A method to statistically process real input and output data from a color input or output device and predict the color-transfer characteristics from an arbitrary input or output signal, or from the output signal and a part of the input signal to predict the remaining part of the input signal. Real input and output data pairs and prediction-source values are prepared which are used to calculate initial values for weighted coefficients. Matrix elements and the prediction value are calculated so that the sum of the squares of a distance between the predicted output and the corresponding plurality of real output data, weighted with a weighting coefficient, is minimized. The matrix elements and the prediction value are used to recalculate the weighting coefficients.

20 Claims, 10 Drawing Sheets

METHOD FOR PREDICTING COLOR TRANSFER CHARACTERISTICS

BACKGROUND OF THE INVENTION

1. Field of Invention

The present invention relates to a method for predicting color transfer characteristics of color image input/output devices, such as scanners, printers, and displays, and is used in systems, such as digital, full-color copying machines, color facsimiles, and color systems that read color documents, perform image processing, and reproduce original document images on a recording medium. More specifically, the present invention relates to a method to determine color-processing coefficients to obtain reproductions of a desired color.

2. Description of Related Art

A color image input/output system may read a document with a scanner. Image processing is performed wherein the RGB color space signal output from the scanner is converted into a color space that is device-independent. After performing image editing operations, image processing is performed to convert the image to CMYK color space signals that are sent to a printer. This data then is printed from the printer. Conversion of a device-dependent RGB color space signal from the scanner into a device-independent color space signal requires an accurate understanding of the relationship between the colors input to the scanner and the RGB color space colors output from the scanner. In other words, the color characteristics of the scanner must be understood. An image-processing operation reverses this relationship. Similarly, the conversion from a device-independent color space signal into a device-dependent CMYK color space signal to be sent to a printer requires an accurate understanding of the relationship between the colors in the CMYK color space received by the printer and the colors output by the printer. In other words, the color characteristics of the output device must be understood. An image-processing operation reverses this relationship. A similar process is involved where the output device is a display.

Methods used to determine color-processing coefficients used in image processing vary according to differences in image processing methods and how to set up a color that is to be reproduced. Additionally, accurate understanding of the characteristics of the device is fundamental. The determination of the color-processing coefficients for image processing may be facilitated where there exists a method for predicting an output signal of a color image input device from an arbitrary input signal, or for predicting an input signal from an arbitrary output signal. Some methods for predicting color transfer characteristics of color input/output signals use physical models based on modeling the physical characteristics of the input/output device and methods that statistically process real input/output data from the device. For example, in Japanese examined utility model publication number 5-18305, a technique is proposed that makes predictions using a 3×3 matrix for the input device (color scanner) and a physical model known as the Neugebauer equation for the output device (printer). A masking parameter is calculated by determining convergence. However, this type of physical model does not have good modeling accuracy and is not fit for practical use even when color-processing coefficients are determined for an actual input/output device. Developing physical models with higher predictive accuracy is difficult. Even if such models could be developed, different models would have to be developed for different types of devices.

In the methods generally referred to as computer color matching, a high-order polynomial or a function corresponding to the physical characteristics of the device is used between the input and the output of a printer. Data pairs including real data from multiple input signals and the corresponding output signals are used to determine the coefficients of the function. The function is solved by an iterative method to provide predictions of input signals from arbitrary output signals. However, the accuracy of the predictions may be affected by the method in which the real data is taken and also by the shape of device-dependent functions. Furthermore, calculations may be time consuming, and when high-order polynomials are used, predictions based on extrapolations outside the color space of the real data may not be performed.

Another method is proposed in Japanese laid-open patent publication number 7-87347 and in "An Accurate Color Transformation Algorithm based on Flexible GCR Accurate Printer Model by Neural Network" (pgs. 125–129, vol.35, No. 2, 1996, Electrophotography). In this method, neural networks are used on data pairs comprising a plurality of real input signals and corresponding output signals. Output signals corresponding to arbitrary input signals, and input signals corresponding to arbitrary output signals may be predicted. Unfortunately, the training required to perform this method is time consuming. Furthermore, as in the case with the use of polynomials, predictions outside the color gamut of the real data may not be obtained by extrapolation.

Another method for predicting input signals from arbitrary output signals was proposed in Japanese laid-open patent publication number 2-226870. In this method, data pairs including a plurality of real input signals and corresponding output signals are used. The number of data pairs is increased through interpolation. If the input and output signals are three-dimensional, local tetrahedral spaces in the input and output are associated with a linear matrix. In this method, there is no smoothing of the data, so the presence of noise in the real data cannot be handled. Also, this method can be used only when the input and the output have the same number of dimensions. Thus, this method cannot be used if the input is four-dimensional, as in YMCK data, and the output is three-dimensional. Furthermore, predictions outside the color gamut of the real data may not be obtained by extrapolation.

U.S. Pat. No. 5,471,324 proposes a method for determining coefficients for a conversion look-up table for printers. In this method, data pairs including a plurality of input signals and corresponding output signals for a printer are used. Simple interpolation is performed to increase the number of data pairs, and weighted averages are used to predict output signals from input signals. However, this method has roughly the same problems as those described for Japanese laid-open patent publication number 2-226870.

Japanese laid-open patent publication number 2-289367 proposes a method for determining color-processing coefficients. In this method, data pairs including a plurality of real input signals and corresponding output signals are processed using a technique analogous to statistical processing. However, the contents of this publication are unclear. It is submitted that this method has the same problems as in Japanese laid-open patent publication number 2-226870 described above. If a smoothing function is involved, the continuity of the predicted values at the boundaries between the local spaces is not supposed to be guaranteed.

SUMMARY OF THE INVENTION

As the following description will make clear, the method for predicting color transfer characteristics of the present invention can perform statistical processing on real input and output data from a color image input/output device and predict color transfer characteristics. In other words, the present invention can predict the output signal corresponding to an arbitrary input signal and an input signal corresponding to an arbitrary output signal, or may use an arbitrary output signal and a part of an input signal to predict the remaining part of the input signal. This makes it possible to predict color-transfer characteristics without being dependent on the color image input/output device. The need to study the physical properties of a particular input or output device to construct a model is eliminated. The present invention makes it possible to make predictions easily simply by determining weight parameters for data components. Also, even if noise is present in the real input and output data pairs used, weight parameters may be determined according to the extent of the noise so that a higher accuracy in prediction is provided, thus allowing the color-processing coefficients of the color image input/output devices to be determined accurately. Furthermore, since the prediction method is simple, predictions may be performed at high speeds and the determination of the color-processing coefficients for the color image input/output device performed quickly.

The present invention provides a concrete method for prediction, such that:

1. The method is not device-dependent, or dependent on physical characteristics of the device;
2. The method assumes the presence of noise in the real input and output data and performs smoothing functions;
3. Input signals that are four-dimensional may be treated in the same manner as three-dimensional data;
4. A high degree of predictive accuracy is provided;
5. The continuity of the predicted values is guaranteed;
6. Extrapolation is possible; and
7. The time required for predictions is shorter than for conventional methods using neural networks.

The present invention employs a matrix to set up a linear relationship with constant elements between input signals from a color image input device or a color image output device and output signals. The elements of the matrix are determined using data pairs including a plurality of real input signal data and corresponding real output signal data. The input signal serves as a prediction-source value, the value on which a prediction is based, and the output signal is the value to be predicted. The matrix is used to determine a predicted output value from the real input signal data. The differences, by component, between the predicted output values and the corresponding plurality of real output data are calculated. These differences are weighted using weight coefficients that are dependent on the prediction-source values. The sum of the squares of these weighted differences are minimized in order to determine the elements of the matrix. It also is possible to use weight coefficients that are dependent on the elements of the matrix as well as on the prediction-source values. In such cases, an iterative method can be used with the matrix elements, the weight coefficients, and the prediction values in order to minimize the sum of the squares of the differences, by component, between the predicted output value and the real output data, these differences being weighted using a weight coefficient.

Alternatively, the output signal may be used as the prediction-source value and the input signal may be the value to be predicted. Another alternative is that the output signal and a part of the input signal may be used as the prediction-source value, and the remaining input signals may be used as the value to be predicted. In these cases, the matrix is used in determining predicted output values from the real input signal data. The differences are calculated, by component, between the real input signal data and the corresponding plurality of real output signal data. The differences are weighted using weight coefficients that are dependent on the prediction value. Iterative methods are used with the matrix elements, the weight coefficients, and the prediction values, in order to minimize the sum of the squares of the weighted differences. In this case, the weight coefficients may be dependent on the prediction-source values as well as on the matrix elements. In either case, it would be possible to increase accuracy by using a data precision function as a factor in the weight coefficients, where this data precision function is calculated based on the interrelation between the real output signal data and the predicted output value, predicted based on real input signal data.

BRIEF DESCRIPTION OF THE DRAWINGS

Similar reference characters denote corresponding features of the invention consistently throughout the appended drawings, in which.

DETAILED DESCRIPTION OF PREFERRED EMBODIMENTS

Figure 1:
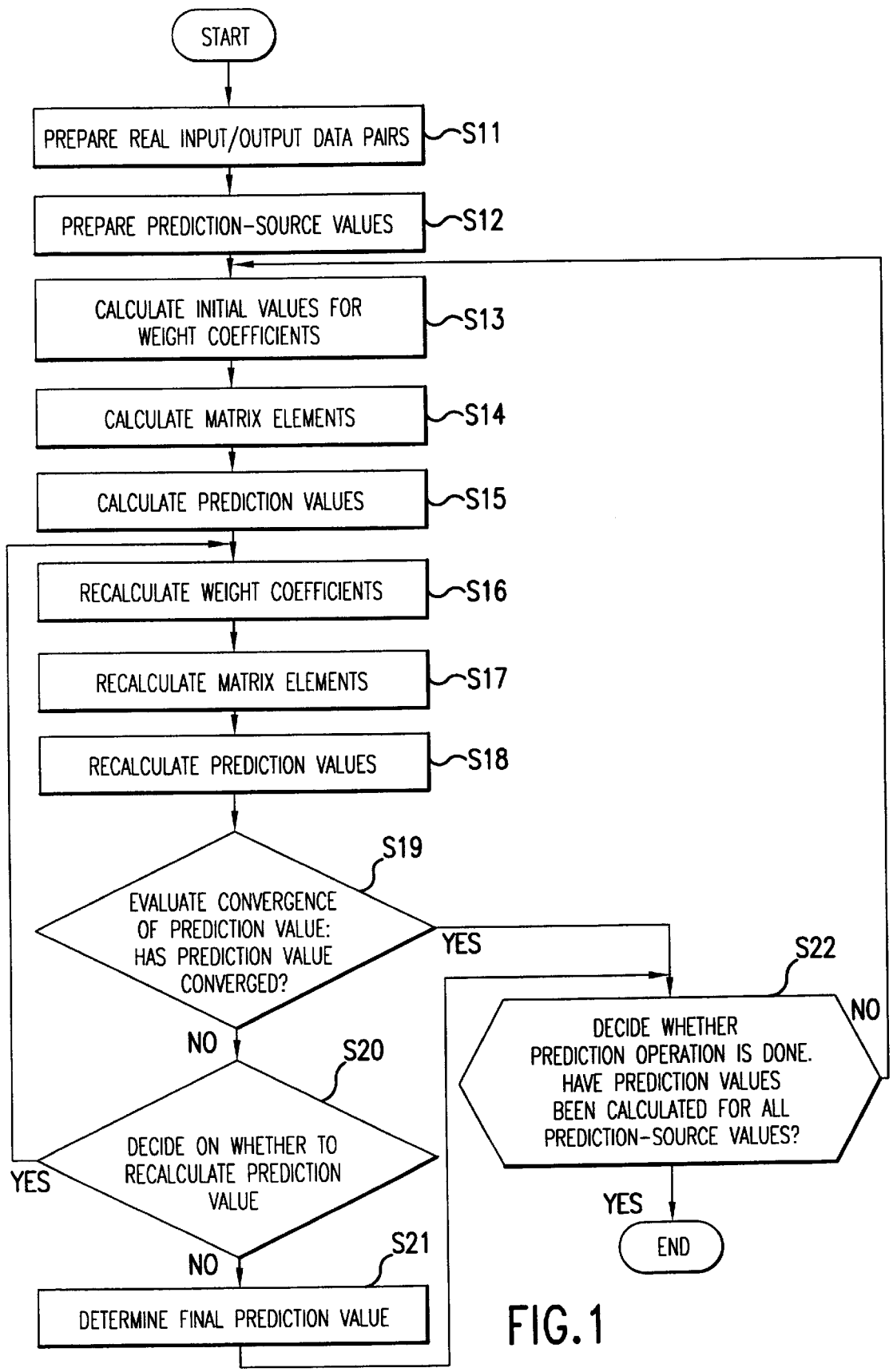
FIG. 1 is a flowchart of the first embodiment of a method for predicting color transfer characteristics according to the present invention.

Throughout the following description, reference will be made to the following equations:

$$\begin{pmatrix} y'_{1i} \\ y'_{2i} \\ y'_{3i} \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \end{pmatrix} \begin{pmatrix} x_{1i} \\ x_{2i} \\ x_{3i} \\ 1 \end{pmatrix} \tag{1}$$

where i=1–n $$\begin{pmatrix} y'_{1i} \\ y'_{2i} \\ y'_{3i} \end{pmatrix} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \end{pmatrix} \begin{pmatrix} x_{1i} \\ x_{2i} \\ x_{3i} \\ x_{2i} \\ 1 \end{pmatrix} \tag{2}$$

where i=1–n $$E_j = \sum_{i=1}^{n} (W_{ij}^n ((y'_{1i} - y_{1i})^2 + (y'_{2i} + y_{2i})^2 + (y'_{3i} + y_{3i})^2)) \tag{3}$$

$$E_j = \sum_{i=1}^{n} (W_{ij}^2 (y'_{1i} - y_{1i})^2) + \sum_{i=1}^{n} (W_{ij}^2 (y'_{2i} - y_{2i})^2) + \sum_{i=1}^{n} (W_{ij}^2 (y'_{3i} - y_{3i})^2) \tag{4}$$

$$E_j = \sum_{i=1}^{n} (W_{ij}^2 ((k_1(y'_{1i} - y_{1i})^2 + (k_2(y'_{2i} - y_{2i})^2 + (k_3(y'_{3i} - y_{3i})^2)) \tag{5}$$

$$\begin{pmatrix} y'_{1j} \\ y'_{2j} \\ y'_{3j} \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \end{pmatrix} \begin{pmatrix} x_{1j} \\ x_{2j} \\ x_{3j} \\ 1 \end{pmatrix} \tag{6}$$

$$\begin{pmatrix} y'_{1j} \\ y'_{2j} \\ y'_{3j} \end{pmatrix} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \end{pmatrix} \begin{pmatrix} x_{1j} \\ x_{2j} \\ x_{3j} \\ x_{2j} \\ 1 \end{pmatrix} \tag{7}$$

$W_{1ij} = F_{ij}(((x_{1i}-x_{1j})/x_{10})^2 + ((x_{2i}-x_{2j})/x_{20})^2 + ((x_{3i}-x_{3j})/x_{30})^2)$ (8)

$W_{1ij} = F_{ij}(((x_{1i}-x_{1j})/x_{10})^2 + ((x_{2i}-x_{2j})/x_{20})^2 + ((x_{3i}-x_{3j})/x_{30})^2 + ((x_{4i}-x_{4j})x_{40})$ (9)

$W_{1ij} = G_{ij}(((m_{11}(x_{1i}-x_{1j})) + (m_{12}(x_{2i}-x_{2j}))^2 + m_{13}(x_{3i}-x_{3j}))^2)/(y_{10})^2 + ((m_{21}(x_{1i}-x_{1j}))^2 + (m_{22}(x_{2i}-x_{2j}))^2 + m_{23}(x_{3i}-x_{3j}))^2)/(y_{20})^2 + ((m_{13}(x_{1i}-x_{1j}))^2 + (m_{32}(x_{2i}-x_{2j}))^2 + m_{33}(x_{3i}-x_{3j}))^2)/(y_{30})^2)$ (10)

$W_{2ij} = G_{ij}(((m_{11}(x_{1i}-x_{1j}))^2 + (m_{12}(x_{2i}-x_{2j}))^2 + m_{13}(x_{3i}-x_{3j}))^2 + (m_{14})(x_{4i}-x_{4j}))_2)/(y_{10})^2 +$ $((m_{21}(x_{1i}-x_{1j}))^2 + (m_{22}(x_{2i}-x_{2j}))^2 + (m_{23}(x_{3i}-x_{3j}))^2 + m_{24}(x_{4i}-x_{4j}))^2)/(y_{20})^2 +$ $((m_{13}(x_{1i}-x_{1j}))^2 + (m_{32}(x_{2i}-x_{2j}))^2 + (m_{33}(x_{3i}-x_{3j}))^2 + (m_{34}(x_{4i}-x_{4j}))^2)/(y_{30})^2)$ (11)

$W_{12ij} = H(W_{1ij}, W_{2ij})$ (12)

$W_{2ij} = G_{ij}(((y_{1i}-y_{1j})/y_{10})^2 + ((y_{2i}-y_{2j})/y_{20})^2 + ((y_{3i}-y_{3j})/y_{30})^2)$ (13)

$W_{1ij} = F_{ij}(((x_{4i}-x_{4j})/x_{40})^2)$ (14)

$W_{12ij} = H(W_{1ij}, W_{2ij})$ (15)

$\Delta y_{i1} = y_{i1} - y_{i1}$ (16)

$\Delta y_{i2} = y_{i2} - y_{i2}$ (17)

$\Delta y_{i3} = y_{i3} - y_{i3}$ (18)

$$\Delta y_{is1} = \left( \sum_{k=1}^{n} (V_k(y'_{1k} - y_{1k})) \right) / \left( \sum_{k=1}^{n} (V_k) \right) \tag{19}$$

where k≠i $$\Delta y_{is2} = \left( \sum_{k=1}^{n} (V_k(y'_{2k} - y_{2k})) \right) / \left( \sum_{k=1}^{n} (V_k) \right) \tag{20}$$

where k≠i $$\Delta y_{is3} = \left( \sum_{k=1}^{n} (V_k(y'_{3k} - y_{3k})) \right) / \left( \sum_{k=1}^{n} (V_k) \right) \tag{21}$$

where k≠i $W_{3i} = J_1(I_{i1}(\Delta y_{i1}, \Delta_{is1}), I_{i2}(\Delta y_{i2}, \Delta_{is2}), I_{i3}(\Delta y_{i3}, \Delta_{is3}))$ (22)

$W_{123ij} = H(W_{1ij}, W_{2ij}, W_{3i})$ (23)

$W_{13ij} = H(W_{1ij}, W_{3i})$ (24)

$W_{23ij} = H(W_{2ij}, W_{3i})$ (25)

$W_{123ij} = H(W_{1ij}, W_{2ij}, W_{3i})$ (26)

$W_{1ij} = 1/((((L_i-L_j)/L_0)^2 + ((a_i-a_j)/a_0)^2 + ((b_i-b_j)/b_0)^2)^p + 1)$ (27)

$W_{21ij} = 1/(((((m_{11}(L_i-L_j))^2 + ((m_{12}(a_i-a_j))^2 + (m_{13}(b_i-b_j))^2)/R_0)^2 +$ $((m_{21}L_i-L_j))^2 + (m_{22}(a_i-a_j))^2 + (m_{23}(b_i-b_j))^2)/G_0)^2 +$ $((m_{31}L_i-L_j))^2 + (m_{32}(a_i-a_j))^2 + (m_{33}(b_i-b_j))^2)/B_0)^2)^p + 1)$ (28)

$W_{12ij} = W_{1ij} + W_{2ij}$ (29)

$W_{1ij} = 1/(((Y_i-Y_j)/Y_0)^2 + ((M_i-M_j)/M_0)^2 + ((C_{i-Cj})/C_0)^2 + ((K_i-K_j)/K_0)^2)^p + 1)$ (30)

$W_{21ij} = 1/(((((m_{11}(Y_i-Y_j)/Y_0)^2 + ((m_{12}(M_i-M_j))^2 + m_{13}(C_1-C_j))^2 + (m_{14}(K_i-K_j))^2)/L_0)^2$ $((m_{21}(Y_i-Y_j))^2 + ((m_{22}(M_i-M_j))^2 + (m_{23}(C_i-C_j))^2 + (m_{24}(K_i-K_j))^2)/a_0)^2((m_{31}(Y_1-Y_j))^2 + (m_{32}(M_i-M_j))^2 + (m_{33}(C_i-C_j))^2 + (m_{34}(K_i-K_j))^2)/(b_0)^2)^p + 1)$ (31)

$\Delta L_i = L_i' - L_i$ (32)

$\Delta a_i = a_i' - a_i$ (33)

$\Delta b_i = b_i' - b_i$ (34)

$$\Delta L_{is} = \left(\sum_{k=1}^{n}(V_{1ik}(L'_k - L_k))\right) / \left(\sum_{k=1}^{n}(V_{1ik})\right) \quad (35)$$

where k≠i $$\Delta a_{is} = \left(\sum_{k=1}^{n}(V_{1ik}(a'_k - a_k))\right) / \left(\sum_{k=1}^{n}(V_{1ik})\right) \quad (36)$$

where k≠i $$\Delta b_{is} = \left(\sum_{k=1}^{n}(V_{1ik}(b'_k - b_k))\right) / \left(\sum_{k=1}^{n}(V_{1ik})\right) \quad (37)$$

where k≠i $$W_{3i} = ((|(\Delta L_{is} + \Delta L_j)^2 \times \Delta L_{is} \times \Delta L_i|^{1/4}/L_0 + |(\Delta a_{is} + \Delta a_i)^2 \times \Delta a_{is} \times \Delta a_i|^{1/4} a_0 +$$
$$(\Delta b_{is} + b_i)^2 \times \Delta b_{is} \times b_i|^{1/4}/b_0)^p + 1)/((|(\Delta L_{is} + \Delta L_j)^2$$
$$\times \Delta L_{is} \times \Delta L_i|^{1/4}/L_0 + |(\Delta a_{is} + \Delta a_i)^2 \times \Delta a_{is} \times \Delta a_i|^{1/4}/a_0) + (\Delta b_{is} + \Delta b_i)^2 \times \Delta b_{is} \times$$
$$\Delta b_i|^{1/4}/b_0))^p + 1) \quad (38)$$

$$W_{123ij} = W_{1ij} \times W_{2ij} \times W_{3i} \quad (39)$$

$$W_{1ij} = 1/((((L_i - L_j)/L_0^2)^p + 1) \quad (40)$$

First, there will be provided an overview of the first embodiment of the method for predicting color transfer characteristics according to the present invention. In this description, the input signal is three- or four-dimensional, and the output signal is three-dimensional. The description will refer to Equations (1) through (7), but the number of dimensions of the input output signals is not restricted to the examples shown, and other numbers of dimensions may be used. Equations (1) and (6) correspond to cases in which the input signal has three dimensions and the output signal has three dimensions. Equations (2) and (7) correspond to cases where the input signal has four dimensions. Equations (3), (4) and (5) correspond to cases where input has three or four dimensions.

First, in Equations (1) and (2), there are n sets of real input signal data $(x_{1i}, x_{2i}, x_{3i})$ or $(x_{1i}, x_{2i}, x_{3i}, x_{4i})$ where $i=1-n$, and predicted values $(y'_{1i}, y'_{2i}, y'_{3i})$, where $i=1-n$. The input signal data and the predicted values are linked by a matrix defining linear relationships containing constants. The elements of the matrix are $m_{11}, m_{22}, \ldots m_{ij}$.

In Equation (3), $E_j$ is the sum of the squares of the weighted Euclidean distance between the predicted output values and the real output data (y) corresponding to the real input signal data (x). The predicted output values (y') are determined from the plurality of real input signal data with the matrix shown in Equations (1) or (2) in which $(y'_{1i}, y'_{2i}, y'_{3i})$, where $i=1-n$, are the predicted output values based on the n sets of real input signal data, $(x_{1i}, x_{2i}, x_{3i})$ or $(x_{1i}, x_{2i}, x_{3i}, x_{4i})$, where $i=1-n$; $(y_{1i}, y_{2i}, y_{3i})$, where $i=1-n$, are the set of n real output signal data values corresponding to $(x_{1i}, x_{2i}, x_{3i})$ or $(x_{1i}, x_{2i}, x_{3i}, x_4)$, where $i=1-n$; and $W_{ij}$, where $i=1-n$, are the weight coefficients for the Euclidean distances between real output signal data and the predicted output values determined from the real input signal data using the matrix shown in Equations (1) or (2).

Equation (6) indicates the formula used to determine a prediction value from an arbitrary value that serves as the basis for the prediction ("prediction-source value" hereinafter) when the input signal is three-dimensional and the output signal is three-dimensional. Elements $m_{11}, m_{12}, \ldots m_{ij}$ are the same as the elements in the matrix shown in Equation (1). When the prediction-source value is an input signal $(x_{1i}, x_{2i}, x_{3i})$, a prediction output signal value $(y'_{1j}, y'_{2j}, y'_{3j})$ may be derived easily through substitution. If the prediction-source value is an output signal $(y_{1j}, y_{2j}, y_{3j})$, the operations in Equation (6) may be reversed to derive the predicted input signal $(x'_{1i}, x'_{2i}, x'_{3i})$.

Equation (7) indicates the formula used to determine a prediction value when the input signal is four-dimensional and the output signal is three-dimensional. Elements $m_{11}, m_{12}, \ldots m_{ij}$ are the same as the elements in the matrix shown in Equation (2). When the arbitrary value is an input signal $(x_{1i}, x_{2i}, x_{3i}, x_4)$, a predicted output signal value $(y'_{1j}, y'_{2j}, y'_{3j}, y'_4j)$ may be derived easily through substitution. If the arbitrary value is an output signal $(y_{1j}, y_{2j}, y_{3j})$, the operations in Equation (7) may not be reversed. Therefore, a subset $x_{4j}$ of the input signal is used as the prediction-source value, and the operations in Equation (7) are reversed to determine the input signal $(x'_{1i}, x'_{2i}, x'_{3i})$, which includes the prediction value for the remainder.

With these formulae, input signals that are four-dimensional may be handled in the same manner as signals that are three-dimensional. Prediction may be performed regardless of the number of dimensions the input assumes and a wide range of applications is available. Also, extrapolation may be performed since the relationship between input and output is set up as a relatively simple linear relationship. Even if the real input/output data pairs do not cover the entire region of the input/output color space, extrapolation may be used to cover the entire input/output color space, and prediction of the characteristics outside the input/output color space may be performed.

When weight coefficients $W_{ij}$, where $i=1-n$, are given, the well-known least squares method may be used to determine elements $m_{11}, m_{12}, \ldots m_{ij}$ of the matrix so as to minimize $E_j$. However, a unique $E_j$ may not be determined if weight coefficients $W_{ij}$, where $i=1-n$, are dependent on the elements of the matrix or on predicted input values. Therefore, in order to minimize $E_j$, optimal values for weight coefficients $W_{ij}$, where $i=1-n$, and matrix elements $m_{11}, \ldots m_{ij}$ must be determined using the iterative method.

As may be seen from Equation (4), which is a modified form of Equation (3), it is possible to transform the expression into a sum of positive components, where each component corresponds to a signal component in the output signal space. Thus, minimizing $E_j$ essentially involves minimizing each expression broken down by signal component. In Equation (5), for each signal component, the difference between the predicted output value, determined from the plurality of real input signal data using the matrix, and the corresponding real output data is weighted through multiplication with a constant. $E'_j$ represents the sum of the squares of these weighted distances. The method of the present invention may be applied to minimize $E'_j$ in Equation (5).

Weight coefficient $W_{ij}$ is based on monotonically decreasing function $F_{ij}$ and monotonically decreasing function $G_{ij}$. Monotonically decreasing function $F_{ij}$ takes as its parameter the Euclidean distance in normalized input signal space between the input signal, which either is the prediction-source value or the prediction value, and the real input signal data. The distance between the two is taken for each signal component and normalized, resulting in difference components in the input space.

Monotonically decreasing function $G_{ij}$ takes as its parameter the Euclidean distance in normalized output signal space between the input signal, which either is the prediction-source value or the prediction value, and the real input signal data. The difference between the prediction-source or predicted input signal and the real input signal of each component is converted into output space using the elements of the matrix, with adjustments for sensitivity.

Since weight coefficient $W_{ij}$ is calculated from monotonically decreasing functions of Euclidean distances, real data for which the distance from prediction-source input or predicted input is large is weighted lightly, while real data for which the distance is small is weighted heavily. Also, since these functions are monotonically decreasing functions, the continuity of the predicted values is more predictable. This predictability makes it possible to determine color-processing coefficients for a color image input/output device with little concern for local discontinuities.

Referring to Equations (8) through (12), the following description presents an example where the input signal is three- or four-dimensional and the output signal is three-dimensional. Equations (8) and (10) correspond to cases where the input signal is three-dimensional, and Equations (9) and (11) correspond to cases where the input signal is four-dimensional and the output signal is three-dimensional. Equation (12) corresponds to cases where input has three or four dimensions.

First, Equations (8) and (9) show the monotonically decreasing fumction used to obtain the weight coefficient. This monotonically decreasing function takes as its parameter the Euclidean distance in normalized input signal space between the input signal, which either is the prediction-source value or the prediction value, and the real input signal data. The distance between the two is taken for each signal component and normalized, resulting in difference components in the input space. Here, $(x_{1i}, x_{2i}, x_{3i})$ or $(x_{1i}, x_{2i}, x_{3i}, x_4 j)$ is the input signal, which serves as either the prediction value or the prediction-source value. $(x_{1i}, x_{2i}, x_{3i})$ or $(x_{1i}, x_{2i}, x_{3i}, x_{4i})$ is the real input signal data. $(x_{10}, x_{20}, x_{30})$ or $(x_{10}, x_{20}, x_{30}, x_{40})$ are the normalization constants for the input signal space. $F_{ij}$ is a monotonically decreasing function. For example, in Equation (8), input signal $(x_{1j}, x_{2j}, x_{3j})$ of the prediction value or the prediction-source value is subtracted from real input signal data $(x_{1i}, x_{2i}, x_{3i})$ to determine the differences $(x_{1i}-x_{1j})$, $(x_{2i}-x_{2j})$, $(x_{3i}-x_{3j})$ for each component. These are then normalized using the normalization constants $(x_{10}, x_{20}, x_{30})$, resulting in $(x_{1i}-x_{1j})/x_{10}$, $(x_{2i}-x_{2j})/x_{20}$, $(x_{3i}-x_{3j})/x_{30}$. The sum of the squares of these then are used as the parameters for monotonically decreasing function $F_{ij}$.

Next, Equations (10) and (11) show a monotonically decreasing function that takes as its parameter the Euclidean distance in normalized output signal space between the input signal, which either is the prediction-source value or the prediction value, and the real input signal data. The difference between the prediction-source or predicted input signal and the real input signal is taken of each component is converted into output space using the elements of the matrix, with adjustments for sensitivity. $(x_{1j}, x_{2j}, x_3)$ or $(x_{1j}, x_{2j}, x_{3j}, x_{4j})$ is the in signal of the predicted values or the values to be predicted. $(x_{1i}, x_{2i}, x_{3i})$ or $(x_{1i}, x_{2i}, x_{3i}, x_{4i})$ is the real input signal data. $m_{11}, m_{12}, \ldots m_{ij}$ are the elements of the matrix described above. $(y_{10}, y_{20}, y_{30})$ are the normalization constants for the output signal space. $G_{ij}$ is the monotonically decreasing function. Conversion to output space components adjusted for sensitivity involves a matrix element multiplied by the difference between the input signal value, which either is the prediction-source value or the prediction value, and the real input signal data, on a component-by-component basis. The products then are squared for each signal component and summed. This method provides differences greater than the method involving conversion into a Euclidean distance in standard output space, which results from an unsquared sum. When taking a sum without squaring, it is possible, due to the signs of the individual sections of the equation, for the sum to be small even though the absolute value is large. By squaring as shown in Equation (10) and Equation (11), the absolute value of each section may be used to take sensitivity into account.

For example, in Equation (10), input signal $(x_{1j}, x_{2j}, x_{3j})$ of the predicted value or the prediction-source value is subtracted from real input signal data $(x_{1i}, x_{2i}, x_{3i})$ to determine differences for each component, $(x_{1i}-x_{1j})$, $(x_{2i}-x_{2j})$, or $(x_{3i}-x_{3j})$. Conversion into output space components may be achieved through matrix multiplication. Instead, as described above, the sum is taken after matrix multiplication and squaring. In other words, what is determined is: $(m_{11}(x_{1i}-x_{1j}))^2+(m_{12}(x_{2i}-x_{2j}))^2+(m_{13}(x_{3i}-x_{3j}))^2$, $(m_{21}(x_{1i}-x_{1j}))^2+(m_{22}(x_{2i}-x_{2j}))^2+(m_{23}(x_{3i}-x_{3j}))^2$, $(m_{31}(x_{1i}-x_{1j}))^2+(m_{32}(x_{2i}-x_{2j}))^2+(m_{33}(x_{3i}-x_{3j}))^2$. These are normalized by using normalization constants $(y_{10}, y_{20}, y_{30})$ to divide by $(y_{10})^2, (x_{20})^2, (x_{30})^2$, and then added to serve as the parameter to monotonically decreasing function $G_{ij}$.

Next, in Equation (12), the two monotonically decreasing functions described above are combined to generate a weight coefficient. The method of combining must be a method that does not eliminate the property that the two functions are monotonically decreasing functions of the Euclidean distances. For example a sum or product operation may be used.

The $W_{12ij}$ weight coefficient derived in Equation (12) is the weight coefficient $W_{ij}$ that appears in Equation (3). Weight coefficient $W_{ij}$ then is used with the least squares method to determine matrix elements $m_{11}, m_{12}, \ldots m_{ij}$ for which $E_j$ is minimized. The matrix of resulting elements $m_{11}, m_{12}, \ldots m_{ij}$ is used to calculated prediction values. When necessary, these calculated prediction values may be used to recalculate weight coefficients and determine matrix elements $m_{11}, m_{12}, \ldots m_{ij}$, for which $E_j$ is minimized, and these then may be used to recalculate the prediction value. By repeating these operations, the prediction values converge so that a desired prediction value is obtained.

FIG. 1 is a flowchart showing an example of how the first embodiment of the method for predicting color transfer characteristics. First, at step S11, the real input/output data pairs are prepared. In this step, multiple sets of real data pairs are prepared from the actual input/output device for which characteristics are to be predicted. In Equations (1) through (3), these real data pairs correspond to the n sets of real input signal data $(x_{1i}, x_{2i}, x_{3i})$, i=1–n, and the corresponding n sets of real output signal data $(y_{1i}, y_{2i}, y_{3i})$, i=1–n. As a specific example, a color scanner may be used to scan various color patches for which the input colors and the RGB output would be measured. The real data pairs to be prepared here would include the chromaticity input coordinates, L*a*b, and the RGB output values. For a display, color patches may be displayed using various combinations of RGB input values which would be measured. Thus, the input RGB values and the output color coordinates, L*a*b, would be used as the real data pairs. In the case of a four-color printer, color patches may be printed using various YMCK percentages which would be measured. Data pairs would be prepared using the input YMCK percentages and the output chromaticity coordinates, L*a*b.

Next, in step S12, the prediction-source values are prepared. Referring to Equations (6) and (7), if the values to be predicted are input signals, $(x_{1j}, x_{2j}, x_{3j})$ or $(x_{1j}, x_{2j}, x_{3j}, x_{4j})$ are prepared as necessary, and if the values to be predicted are output signals, $(y_{1j}, y_{2j}, y_{3j})$, or $(y_{1j}, y_{2j}, y_{3j})$ and $(x_{4j})$ are prepared as necessary.

In step S13, the initial values of the weight coefficients are calculated. The initial values for the n sets of weight coefficients $W_{1j}$ are calculated as shown in Equation (8). In order for convergence to occur quickly, it is important that the initial values be as close as possible to the values that finally are determined with the successive approximation method. For example, if the values to be predicted are input signals, the weights $W_{1ij}$ are used based on the monotonically decreasing function $F_{ij}$ for a Euclidean distance in the normalized input signal space, which is determined with normalized difference components in the input space calculated between each component of the input signal, for which the prediction is to be performed, and the real input signal data, as shown in Equations (8) and (9). The elements of the matrix are not determined at this point, so the monotonically decreasing function $G_{ij}$ shown in Equations (10) and (11) is not used, and the initialization value is based solely on weights $W_{ij}$.

If the value on which the prediction is to be based is the output signal, output space signal components are substituted. If the input is three-dimensional, Equation (13) is used to determine weight $W'_{2ij}$. Weight $W'_{2ij}$ is based on monotonically decreasing function $G_{ij}$ for a Euclidean distance in the normalized input signal space, which is determined with normalized difference components in the output space calculated between each component of the signal for which the prediction is to be performed and the real output signal data. If the input is four-dimensional, a weight $W'_{12ij}$ can be used, where $W'_{12ij}$ is based on function H shown in Equation (15), which combines $W'_{2ij}$ shown in Equation (13) with weight $W'_{1ij}$ as shown in Equation (14). $W'_{2ij}$ is based on monotonically decreasing function $G_{ij}$ for the distance in the input signal space where only one difference in the input space is normalized.

Next, at step S14, the elements of the matrix are calculated. $E_j$ is the sum of the squares of the weighted Euclidean distances between predicted output values, which are determined using the matrix from the plurality of input signal data, and the corresponding plurality of real output data. The least squares method is used to minimize $E_j$ so that a preliminary calculation of elements $m_{11}, m_{12}, \ldots m_{ij}$ of the matrix may be made. The weighted coefficient $W_{ij}$ used here is the weight determined from the calculation of the initial weight coefficient values performed at step S13.

Next, at step S15, Equation (6) or Equation (7) is used to make a preliminary calculation of a prediction value using the value on which the prediction is to be made. Elements $m_{11}, m_{12}, \ldots m_{ij}$ of the matrix from the calculation of matrix elements performed at step S14 are used to determine: $(y'_{1j}, y'_{2j}, y'_{3j})$ if the prediction-source value is input signal $(x'_{1j}, x'_{2j}, x'_{3j})$ or $(x'_{1j}, x'_{2j}, x'_{3j}, x'_{4j})$; or $(x'_{1j}, x'_{2j}, x'_{3j})$ if the prediction-source value is output signal $(y'_{1j}, y'_{2j}, y'_{3j})$ or $(y'_{1j}, y'_{2j}, y'_{3j})$ and $(x'_{4j})$.

Next, at step S16, the weight coefficients are recalculated. Weight $W_{12ij}$ is recalculated for the n sets of raw data. $W_{2ij}$ is based on function H shown in Equation (12), which combines weight $W_{1ij}$, based on monotonically decreasing function $F_{ij}$ as shown in Equations (8) or (9), and weight $W_{2ij}$, based on monotonically decreasing function $G_{ij}$ as shown in Equations (10) or (11). Monotonically decreasing function $F_{ij}$ takes as its parameter the Euclidean distance in normalized input signal space between the input signal, which is either the prediction-source value or the prediction value, and the real input signal data. The distance between the two is taken for each signal component and normalized, resulting in difference components in the input space. Monotonically decreasing function $G_{ij}$ takes as its parameter the Euclidean distance in normalized output signal space between the input signal, which is either the prediction-source value or the prediction value, and the real input signal data. The difference between the prediction-source or predicted input signal and the real input signal is taken on component-by-component basis and converted into output space using the elements of the matrix, with adjustments for sensitivity.

Next, at step S17, the elements of the matrix are recalculated. The least-squares method is used to recalculate elements $m_{11}, m_{12}, \ldots m_{ij}$ so that $E_j$ is minimized. As shown in Equation (3), weighted Euclidean distances between the predicted output values, determined from the plurality of real input signal data using the matrix, and the corresponding plurality of real output data are taken. $E_j$ represents the sum of the squares of these weighted Euclidean distances.

Next, at step S18, the predicted values are recalculated. Equation (6) or Equation (7) is used to calculate the predicted values from the prediction-source values again. The recalculated matrix elements $m_{11}, m_{12}, \ldots m_{ij}$, determined at step S17, are used to determine $(y'_{1j}, y'_{2j}, y'_{3j})$ if the prediction-source value is input signal $(x_{1j}, x_{2j}, x_{3j})$ or $(x_{1j}, x_{2j}, x_{3j}, x_{4j})$. Alternatively, $(x'_{1j}, x'_{2j}, x'_{3j})$ is calculated if the prediction-source values are output signal $(y_{1j}, y_{2j}, y_{3j})$ or $(y_{1j}, y_{2j}, y_{3j})$ and $(x_{4j})$.

Next, at step S19, the convergence of the predicted value is evaluated. A comparison is made between the predicted value determined in the calculation of the predicted value performed at step S15 and the predicted value determined in the recalculation of the predicted value at step S18, or the previous recalculation of the predicted value performed at an earlier iteration of step S18. An evaluation is made as to whether there is convergence between the predicted values. The method used for the evaluation can involve, for example, determining for each component the difference between the current predicted value and the previous predicted value. Convergence will be detected if the absolute values of the differences are smaller than predetermined threshold values for each component. If convergence is detected, the current predicted value determined from the prediction value recalculation operation performed at step S18 is accepted as the final predicted value, and control proceeds to step S22, where completion of the prediction operation is evaluated. If no convergence is detected, control proceeds to step S20, where an evaluation of whether to recalculate the predicted value is performed.

At step S20, an evaluation is made regarding the recalculation of the predicted value.

The convergence direction of the predicted value and the number of convergence calculations performed are determined, and an evaluation is made as to whether further convergence calculations should be performed. This operation prevents the calculations from going into an endless loop in case the predicted values diverge at an extreme. For example, this operation allows recalculation of the predicted value to be performed unconditionally at the first iteration. Starting with the second iteration, an evaluation is made, on a component-by-component basis, of the relationship between the current predicted value and the predicted value from the previous iteration, and the relationship between the predicted value from the previous iteration and the predicted value from two iterations back. If convergence takes place in the same direction, the predicted value is to be recalculated.

If divergence takes place in different directions, the number of iterations is counted. If the count is at or less than a predetermined threshold value, the predicted value is to be recalculated. If the count exceeds the threshold value, the predicted value is not recalculated since it is assumed that divergence has taken place and that no convergence will take place. If it is determined that no recalculation of the predicted value is to be performed, control proceeds to step S16, where the weight coefficients are recalculated. The convergence calculations are repeated, and if it is determined that no recalculation is to take place, control proceeds to step S21, where the predicted value is finalized.

At step S21, the predicted value is finalized. If there is divergence of the predicted value around some extreme, a value that looks most likely is determined as the final predicted value. The recalculated predicted values are stored in memory, and, for example, the average of all the predicted values taken could be calculated. Alternatively, the predicted value for which the difference between the value and the previously predicted value is the smallest may be selected.

Next, at step S22, an evaluation is made as to whether predicted values have been calculated for all the prediction-source values. If calculations are not complete, control returns to step S13, where the initial weight coefficient values are calculated, and prediction calculations are repeated for the next prediction-source value. When all calculations have been completed, the color transfer characteristics prediction process for the color image input/output device is completed.

The following is a description of the second embodiment of a method for predicting color transfer characteristics according to the present invention. In this embodiment, weight coefficient $W_{ij}$ shown in Equation (3) is based on monotonically decreasing function $F_{ij}$ and monotonically decreasing function $G_{ij}$. Monotonically decreasing function $F_{ij}$ takes as its parameter the Euclidean distance in normalized input signal space calculated between the input signal, which either is the prediction-source value or the prediction value, and the real input signal data. The distance between the two is taken for each signal component and normalized, resulting in difference components in the input space. Monotonically decreasing function $G_{ij}$ takes as its parameter the Euclidean distance in normalized output signal space calculated between the input signal, which either is the prediction-source value or the prediction value, and the real input signal data. The difference between the prediction-source or predicted input signal and the real input signal is taken on a component-by-component basis and converted into output space components using the elements of the matrix, with adjustments for sensitivity. In addition to functions $F_{ij}$ and $G_{ij}$, weight coefficient $W_{ij}$ also uses data precision function $J_i$. Data precision function $J_i$ is a function calculated from the interrelation between the real output signal data and the predicted output value predicted from real input signal data, based on weight coefficients $W_{ij}$ and $W_{2ij}$ described above. Data precision function $J_i$ indicates the reliability of real data pairs that contain noise.

Just as in the first embodiment, the monotonically decreasing function $F_{ij}$ takes as its parameter the Euclidean distance in normalized input signal space between the input signal, which either is the prediction-source value or the prediction value, and the real input signal data. The distance between the two is taken for each signal component and normalized, resulting in difference components in the input space. Just as in the first embodiment, monotonically decreasing function $G_{ij}$ takes as its parameter the Euclidean distance in normalized output signal space between the input signal, which is either the prediction-source value or the prediction value, and the real input signal data. The difference between the prediction-source or predicted input signal and the real input signal is taken on a component-by-component basis and converted into output space components using the elements of the matrix, with adjustments for sensitivity. Accordingly, Equations (16) through (23) will be used in the following description of will cover data precision function $J_i$, which is calculated from the interrelation between the real output signal data and the predicted output value predicted from the real input signal data using the two types of weights.

Equations (16) through (18) indicate the difference components for the i-th real data pair between predicted output value $(y'_{i1}, y'_{i2}, y'_{i3})$ and real output data $(y_{i1}, y_{i2}, y_{i3})$. Equation (19) through Equation (21) indicate the weighted average, using weight coefficient $V_k$, of the difference components between raw output data and predicted output values for all data pairs except for the i-th real data pair. The weighting may, for example, be a monotonically decreasing function of Euclidean distances in normalized input signal space of input space difference components, involving the differences between the i-th real input signal data and real input signal data for all pairs except the i-th.

Equation (22) is a data precision function where the difference components in Equation (16) through Equation (21) are associated with each other. The data precision fumction $J_i$ shown here uses functions $I_{i1}, I_{i2}, I_{i3}$, which indicate the reliability of the real data pairs. Functions $I_{i1}, I_{i2}, I_{i3}$ use the direction of the difference between the predicted output value corresponding to the i-th real data pair and the real output data, as well as the sizes of the differences $\Delta y_{i1}, \Delta y_{i2}, \Delta y_{i3}$. Functions $I_{i1}, I_{i2}, I_{i3}$ also use the direction of the difference of the weighted averages between the predicted output value and the real output data with regard to all real data pairs, excluding the i-th real data pair, as well as the size of the differences $\Delta y_{is1}, \Delta y_{is2}, \Delta y_{is3}$. If the two have the same direction, functions $I_{i1}, I_{i2}, I_{i3}$ return large values for large differences. If the two have different directions, functions $I_{i1}, I_{i2}, I_{i3}$ return small values for large differences.

In Equation (23), weight coefficient $W_{123ij}$ is calculated from composite function H based on weights $W_{1ij}, W_{2ij}$ which use monotonically decreasing functions $F_{ij}$ and $G_{ij}$, and weight $W_{3i}$, which uses data precision function $J_i$. The method used in the composite function must be a method that does not alter the fact that the monotonically decreasing functions decrease monotonically within their Euclidean distance parameters. Also, the method must leave intact the property of the data precision function that indicates the reliability of data pairs. For example, the method may involve adding or multiplying the functions.

Figure 2:
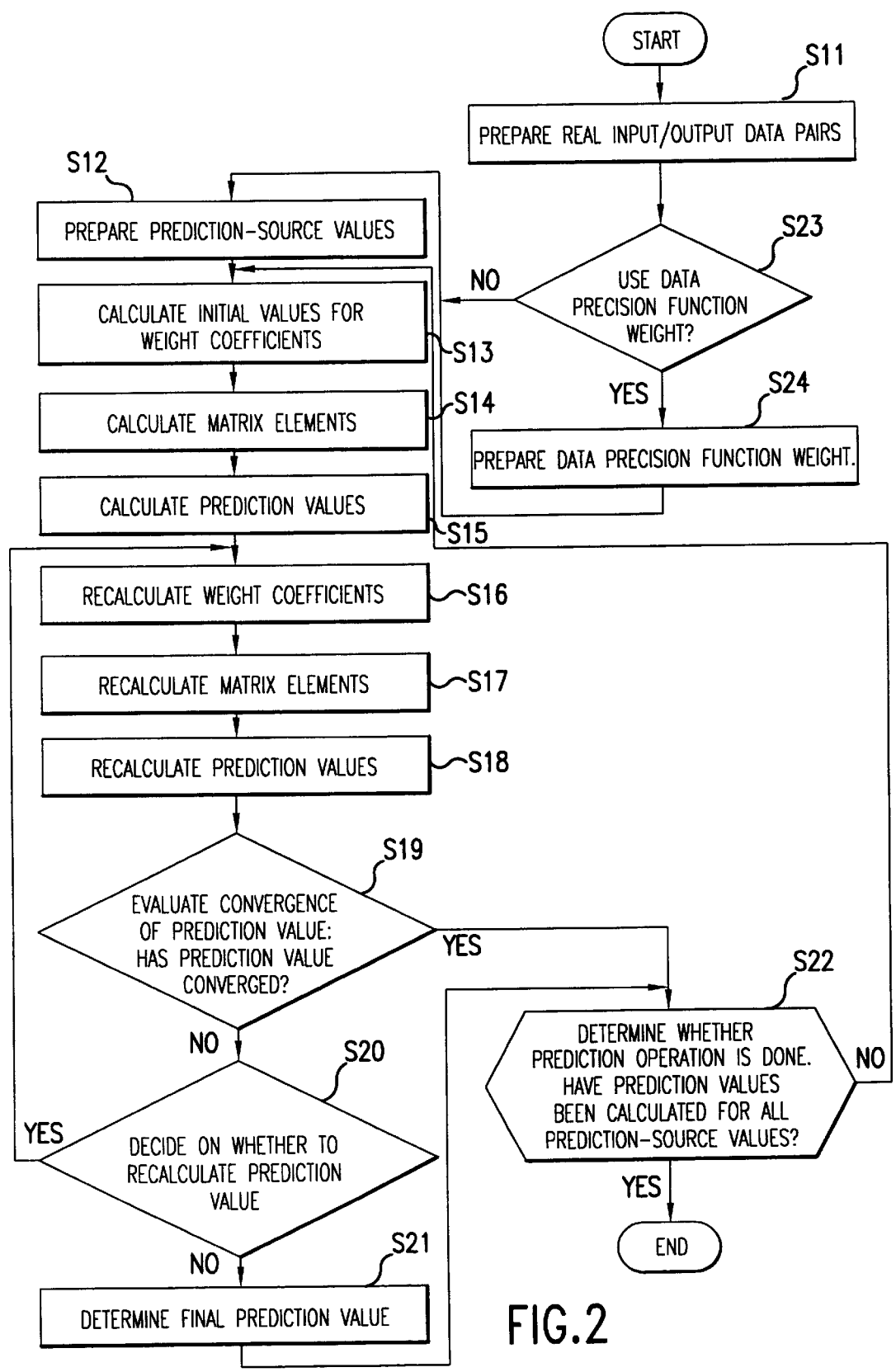
FIG. 2 is a flowchart of the second embodiment of a method for predicting color transfer characteristics according to the present invention.
Figure 3A:
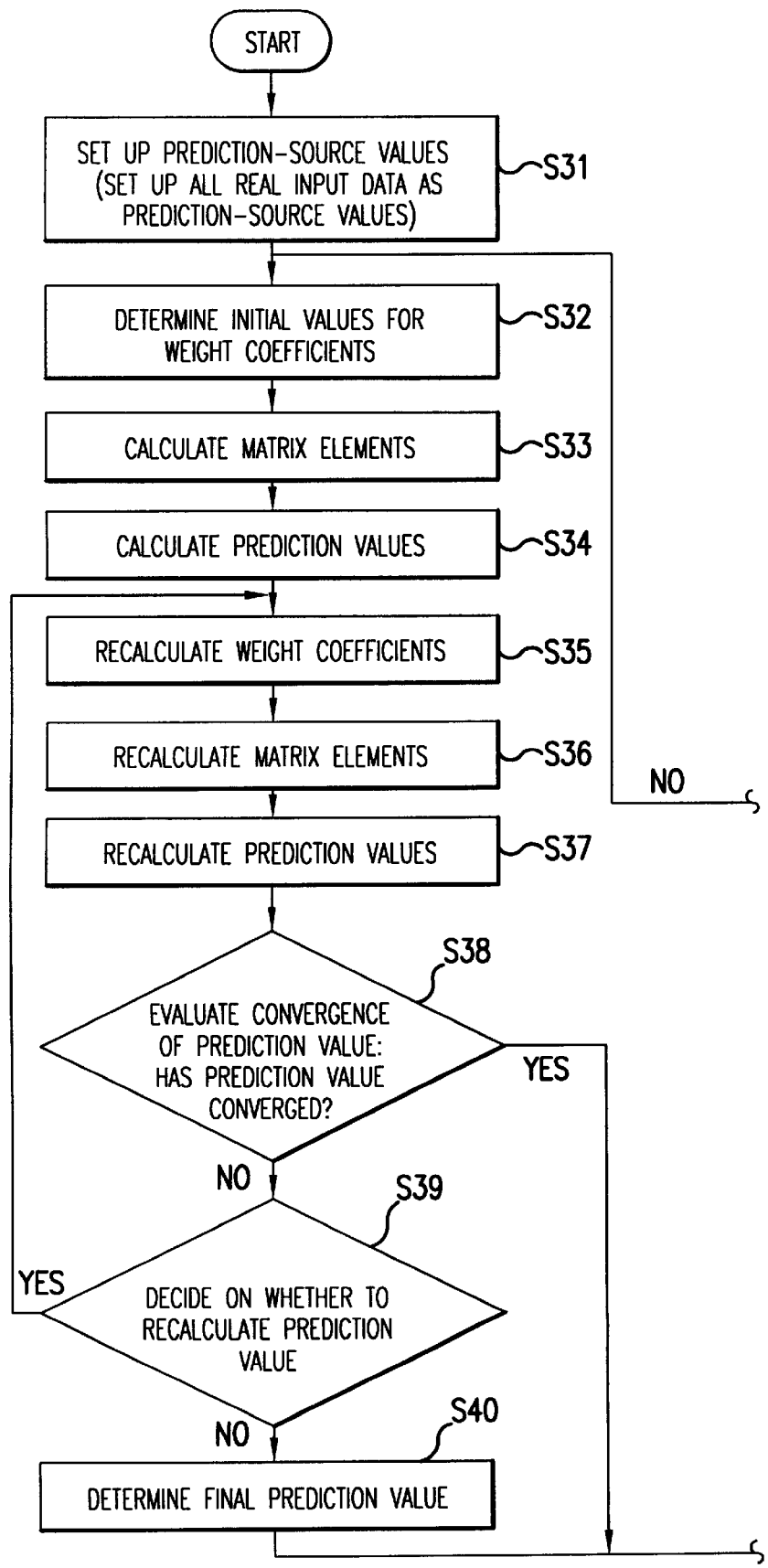
FIG. 3 is a flowchart of a method for preparing the data precision function in the second embodiment of a method for predicting color transfer characteristics according to the present invention.
Figure 3B:
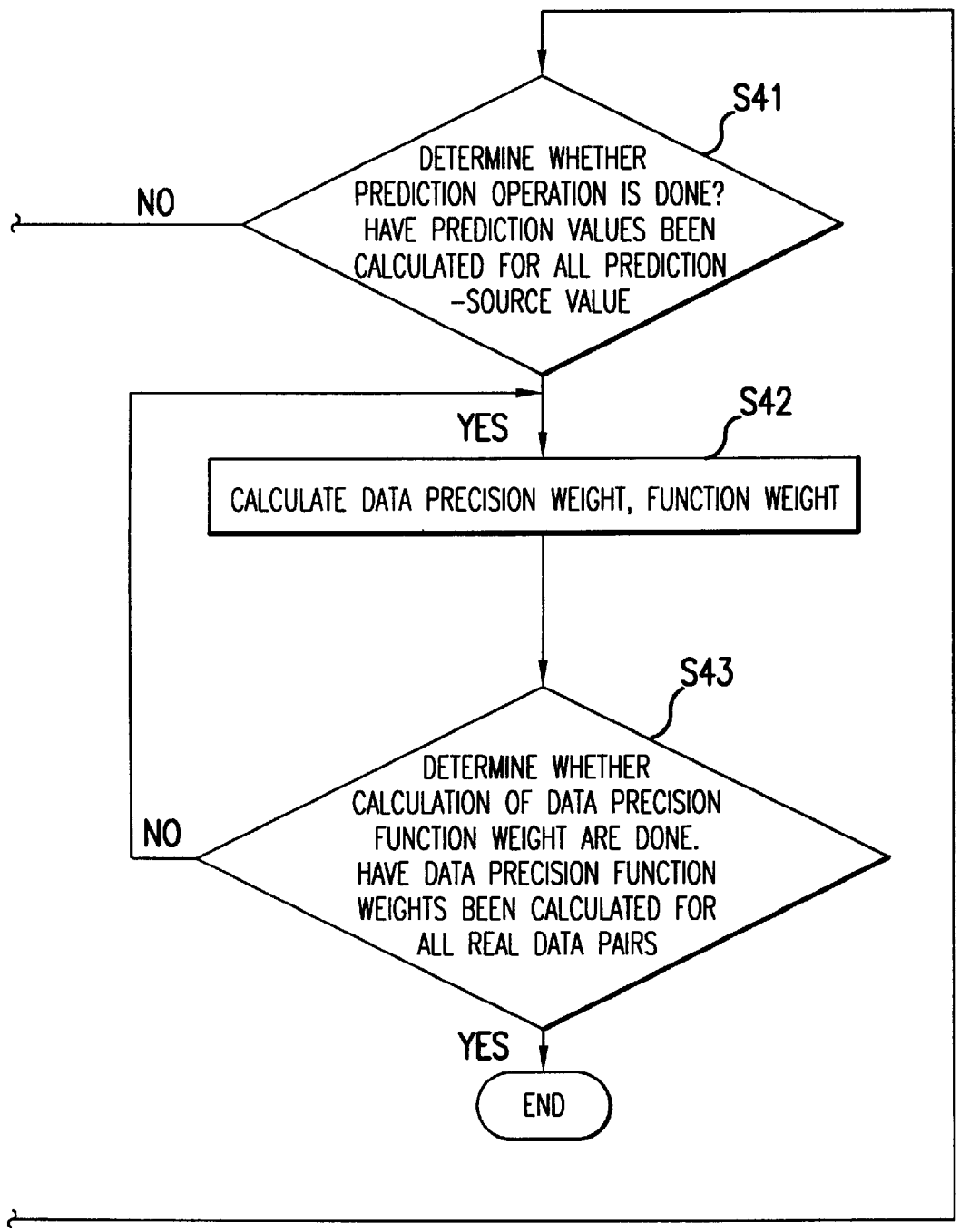

FIG. 2 is a flowchart showing the second embodiment of the method for predicting color transfer characteristics according to the present invention. FIG. 3 is a flowchart showing the details of how the data precision function is prepared. In this example, the data precision function may be used selectively. If the data precision function is not selected, operations are the same as those indicated in the first embodiment described above. The preparation of real input/output data pairs at step S11 is identical to the corresponding operations performed when weighting is determined without the data precision function. Step S23 determines whether to use the data precision function weighting. If it is not to be used, control proceeds to step S12, and the operations described in the embodiment above are performed. If weight coefficients based on the data precision function are to be used, control proceeds to step S24, where the data precision function is prepared.

FIG. 3 shows the operations involved in preparing data precision function weighting performed at step S24. At step S31, the prediction-source values are set up. All the real input data prepared in the real input data preparation performed at step S11 are set up as prediction-source values, thus preparing for the prediction of output values from real input data that takes place starting at step S32.

At step S32, the initial values of the n sets of weight coefficients shown in Equation (3) are calculated. The initial values can be based on weight $W_{1ij}$, which uses monotonically decreasing function $F_{ij}$ of the Euclidean distance in normalized input signal space. The distance is determined by the input space difference components of the normalized distance between the real input signal data and the prediction-source input signal.

Next, at step S33, matrix elements are calculated. As shown in Equation (3), weighted Euclidean distances between the predicted output values, determined from the plurality of real input signal data using the matrix, and the corresponding plurality of real output data are taken. $E_j$ is the sum of the squares of these weighted Euclidean distances. Matrix elements $m_{11}, m_{,12}, \ldots m_{ij}$ are determined by minimizing $E_j$ using the least-squares method. The weight coefficient $W_{ij}$ is determined by the calculation of initial weight coefficient values performed at step S32.

Next, at step S34, prediction values are calculated. Equation (6) is used to make calculations of preliminary prediction values from prediction-source values. Since the prediction-source values are input signals $(x_{1j}, x_{2j}, x_{3j})$, matrix elements $m_{11}, m_{,12}, \ldots m_{ij}$ determined in the matrix element calculation operation performed at step S33 are used to determine $(y'_{1j}, y'_{2j}, y'_{3j})$.

Next, at step S35, weighted coefficients are recalculated for the n sets of raw data pairs. $W_{12ij}$ is based on function H shown in Equation (12), which combines weight $W_{1ij}$, based on monotonically decreasing function $F_{ij}$, as shown in Equation (8), and weight $W_{2ij}$, based on monotonically decreasing function $G_{ij}$ as shown in Equation (10). Monotonically decreasing function $F_{ij}$ takes as its parameter the Euclidean distance in normalized input signal space between the input signal, which either is the prediction-source value or the prediction value, and the real input signal data. The distance between the two is taken for each signal component and normalized, resulting in difference components in the input space. Monotonically decreasing function $G_{ij}$ takes as its parameter the Euclidean distance in normalized output signal space between the input signal, which either is the prediction-source value or the prediction value, and the real input signal data. The difference between the prediction-source or predicted input signal and the real input signal is taken on a component-by-component basis and converted into output space components using the elements of the matrix, with adjustments for sensitivity.

Next, at step S36, the matrix components are recalculated. The least-squares method is used to recalculate elements $m_{11}, m_{,12}, \ldots m_{ij}$ so that $E_j$ is minimized. As shown in Equation (3), weighted Euclidean distances between the predicted output values, determined from the plurality of real input signal data using the matrix, and the corresponding plurality of real output data are taken. $E_j$ is the sum of the squares of these weighted Euclidean distances.

Next, at step S37, the predicted values are recalculated. Equation (6) is used to calculate the predicted values from the prediction-source values again. The recalculated matrix elements $m_{11}, m_{,12}, \ldots m_{ij}$, determined at step S36, are used to determine $(y'_{1j}, y'_{2j}, y'_{3j})$ since the prediction-source value is input signal $(x_{1j}, x_{2j}, x_{3j})$.

Next, at step S38, the convergence of the predicted value is evaluated. A comparison is made between the predicted value determined in the recalculation of the predicted value performed at step S37 and the predicted value determined in the calculation at step S34 or the previous recalculation of the predicted value at step S37. An evaluation is made as to whether there is convergence in the predicted values. The method used for the evaluation can involve, for example, determining for each component the difference between the current predicted value and the previous predicted value. Convergence will be detected if the absolute values of the differences are smaller than predetermined threshold values for each component. If convergence is detected, the current predicted value determined from the prediction value recalculation operation performed at step S37 is accepted as the final predicted value, and control proceeds to step S41, where completion of the prediction operation is evaluated. If no convergence is detected, control proceeds to step S39, where an evaluation of whether to recalculate the predicted value is performed.

At step S39, an evaluation is made on whether to recalculate the predicted value. The convergence direction of the predicted value and the number of convergence calculations performed are determined, and an evaluation is made as to whether further convergence calculations should be performed. This operation prevents calculations from going into an endless loop where the predicted values diverge at an extreme point. For example, this operation allows recalculation of the predicted value to be performed unconditionally at the first iteration. Starting with the second iteration, an evaluation is made, on a component-by-component basis, of the relationship between the current predicted value and the predicted value from the previous iteration, and the relationship between the predicted value from the previous iteration and the predicted value from two iterations back. If convergence takes place in the same direction, the predicted value is to be recalculated. If divergence takes place in different directions, the number of iterations is counted. If the count is at or less than a pre-determined threshold value, the predicted value is to be recalculated. If the count exceeds the threshold value, the predicted value is not recalculated since it is assumed that divergence has taken place and that no convergence will take place. If it is determined here that no recalculation of the predicted value is to be performed, control proceeds to step S35, where the weight coefficients are recalculated. The convergence calculations are repeated, and if it is determined that no recalculation is to take place, control proceeds to step S40, where the predicted value is finalized.

At step S40, the predicted value is finalized. If there is divergence of the predicted value around some extreme, a value that looks most likely is determined as the final predicted value. The recalculated predicted values are stored in memory, and, for example, the average of all the predicted values taken since dispersion begun may be calculated. Alternatively, the predicted value for which the difference between the value and the previously predicted value is the smallest may be selected.

Next, at step S41, an evaluation is made as to whether predicted values have been calculated for all the prediction-source values. If calculations are not complete, control returns to step S32, where the initial weight coefficient values are calculated, and prediction calculations are repeated for the next prediction-source value. When calculations have been completed, control proceeds to step S42, where data precision function weighting is calculated.

At step S42, data precision function weighting is calculated. Data precision function weight $W_{3i}$ is calculated according to data precision function $J_i$ shown in Equations (16) through (22). The data precision function indicates the reliability of the real data pairs. The data precision function uses the direction and size of the difference between the predicted output value for the real data pair being considered and the corresponding real data pair being considered. The data precision function also uses the direction and size of the weighted average difference between the predicted output value for real data pairs (excluding the real data pair under consideration) and the real output data. If the two have the same direction, the data precision function returns large values for large differences. If the two have different directions, the data precision function returns small values for large differences.

At step S43, an evaluation is made as to whether the calculation of data precision function weights is finished for all the input and output real data pairs. If calculations are not finished, control returns to step S42, where data precision function weights are calculated again. If calculations are finished, control proceeds to step S12 shown in FIG. 2, where prediction-source values are prepared.

The prediction operations from step S12 through S22 in FIG. 2 are performed almost identically whether or not data precision function weights are used. At step S13, where the initial weight coefficient values are calculated, the initial values for n sets of weight coefficients $W_{ij}$, as shown in Equation (3), are calculated. For example, if the prediction-source values are input signals, the initial values would be a composite of weight $W_{1ij}$, which is based on monotonically decreasing function $F_{ij}$, and data precision function weight $W_{3i}$, where the composition of functions would be performed as shown in Equation (24). Monotonically decreasing function $F_{ij}$ takes as a parameter the Euclidean distance in normalized input signal space determined by input space difference components based on normalized difference components between the prediction-source input signal values and the real input signal data, as shown in Equations (8) and (9). If the prediction-source value is the output signal, and the input signal is three-dimensional, the initial values would be a composite, as shown in Equation (25) below, of weight $W'_{2ij}$, which is based on monotonically decreasing function $G_{ij}$, and data precision function weight $W_{3i}$. Monotonically decreasing function $G_{ij}$ is based on a Euclidean distance in normalized input signal space determined from output space difference components of normalized differences between prediction-source output values and real output signal data. If the input is four-dimensional, weight $W'_{123ij}$ can be used based on a composite, as shown in Equation (26) below, of data precision function weight $W_{3i}$, weight $W'_{2ij}$ as shown in Equation (13), and weight $W'_{ij}$ as shown in Equation (14), which is based on monotonically decreasing function $F_{ij}$. $F_{ij}$ takes as its parameter a distance in the input signal space where only one difference component in the input space is normalized.

At step S16, the weighting coefficients are recalculated. Weight $W_{123ij}$ is recalculated for the n sets of data pairs based on composite function H shown in Equation (23).

Composite function H combines weight function $W_{1ij}$, which is based on monotonically decreasing function $F_{ij}$ as shown in Equation (8) or Equation (9), $W_{2ij}$, which is based on monotonically decreasing function $G_{ij}$ as shown in Equation (10) or Equation (11), and weight $W_{3i}$, which is based on data precision function $J_i$ shown in Equation (22). Monotonically decreasing function $F_{ij}$ takes as its parameter a Euclidean distance in normalized input space determined from input space difference components determined from normalized differences between the components of the input signal, which includes the prediction-source value or the prediction value, and the real input signal data. Monotonically decreasing function $G_{ij}$ takes as its parameter a Euclidean distance in normalized output signal space between the input signal, which is either the prediction-source value or the prediction value, and the real input signal data. The difference between the prediction-source or predicted input signal and the real input signal is taken on a component-by-component basis and converted into output space components using the elements of the matrix, with adjustments for sensitivity.

Apart from step S13 and step S16 described above, all operations are performed in the same manner whether or not data precision function weights are to be used. By performing the prediction operations from step S12 through step S22, predictions with data precision function weighting may be performed.

The following is a description of the third embodiment of the method for predicting color transfer characteristics according to the present invention. In this example, weighting coefficient $W_{ij}$ in Equation (3) is based solely on monotonically decreasing function $F_{ij}$, as in the first embodiment. Monotonically decreasing function $F_{ij}$ takes as its parameter a Euclidean distance in normalized input signal space, where the distance is determined from input space difference components of differences between the prediction-source value input signal and the real input signal data, and where each signal component is normalized through division by a constant.

This monotonically decreasing function $F_{ij}$ is the same as the monotonically decreasing function $F_{ij}$ shown in Equations (8) or (9), which takes as its parameter a Euclidean distance in normalized input signal space, where the distance is determined from input space difference components of differences between the prediction-source value input signal and the real input signal data, and where each signal component is normalized through division by a constant. When the prediction-source values are arbitrary output signals and the corresponding signal values prediction is to be determined, the method for determining the predicted value is almost identical to the method shown in FIG. 1, except, since monotonically decreasing function $F_{ij}$ is dependent on the predicted input signal value, $W_{ij}$ from Equations (8) or (9) is used instead of $W_{12ij}$ from Equation (12) as weight coefficient $W_{ij}$ in Equation (3). Therefore, the following description will describe the calculation of a predicted output value corresponding to an arbitrary input signal, which serves as the prediction-source value.

Figure 4:
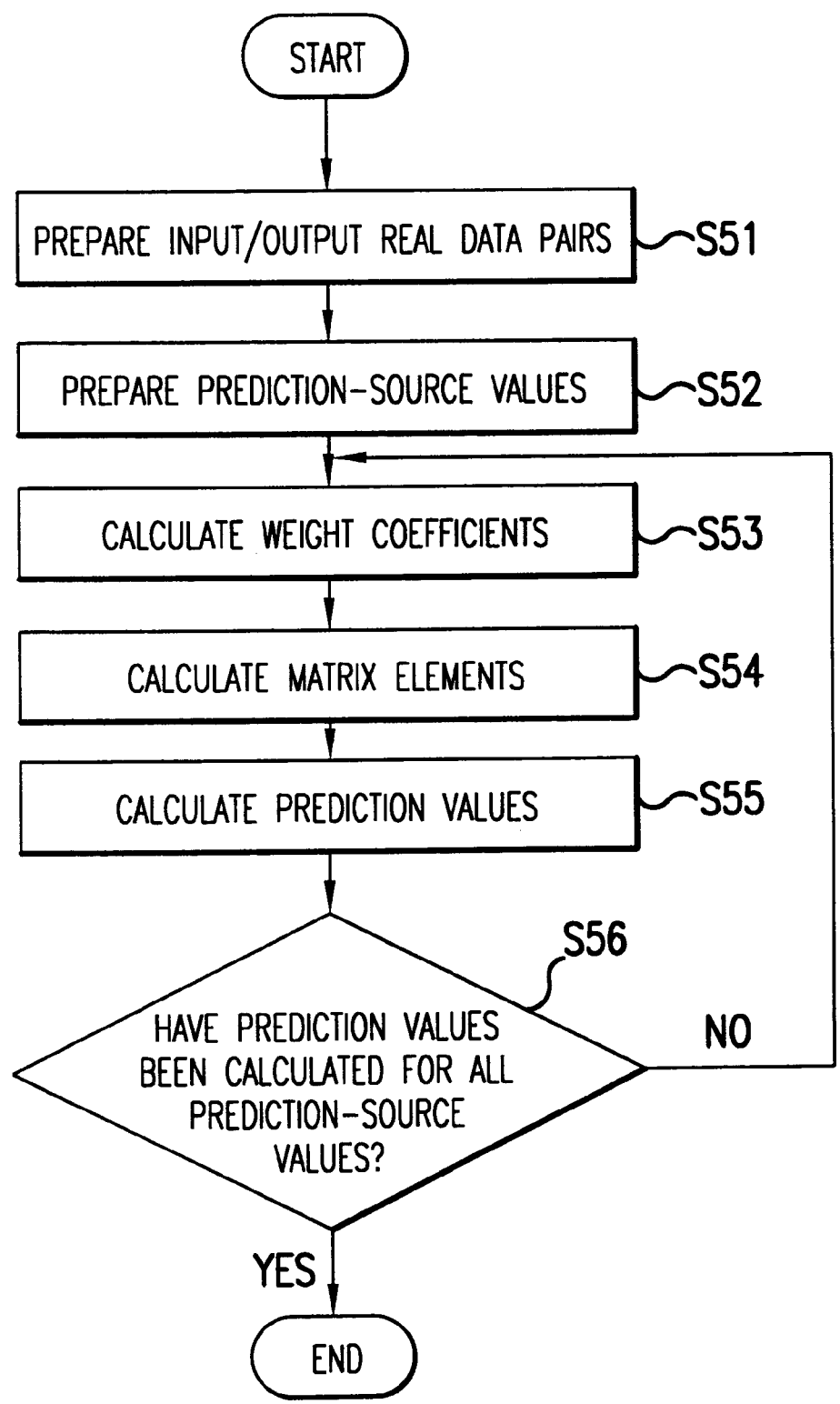
FIG. 4 is a flowchart of the third embodiment of a method for predicting color transfer characteristics according to the present invention, when an arbitrary input signal (the prediction-source value) is used to determine an output signal (prediction value)

FIG. 4 is a flowchart showing the third embodiment of the method for predicting color transfer characteristics of the present invention. In this example, a predicted output value corresponding to an arbitrary input signal, which serves as the prediction-source value, will be determined. First, at step S51, real input and output data pairs are prepared. This operation is identical to the preparation of real input and output data pairs performed at step S11 shown in FIG. 1.

Next, at step S52, the prediction-source values are prepared. Since the prediction-source values are input signals, the necessary number of prediction-source value input signals $(x_{1j}, x_{2j}, x_{3j})$ or $(x_{1j}, x_{2j}, x_{3j}, x_{4j})$ are prepared for the prediction-source values.

Next, at step S53, the weight coefficients are calculated. In this operation, n sets of weight coefficients $W_{ij}$ are calculated. Since the prediction-source values are input signal values, the weight coefficients may be determined using monotonically decreasing function $F_{ij}$, as shown in Equations (8) or (9). Monotonically decreasing function $F_{ij}$ takes as its parameter a Euclidean distance in normalized input signal space, where the distance is determined from input space difference components of differences between the prediction-source value input signal and the real input signal data, and where each signal component is normalized through division by a constant.

Next, at step S54, the matrix elements are calculated. As shown in Equation (3), weighted Euclidean distances between the predicted output values, determined from the plurality of real input signal data using the matrix, and the corresponding plurality of real output data are taken. $E_j$ represents the sum of the squares of these weighted Euclidean distances. Matrix elements $m_{11}$, $m_{12}$, ... $m_{ij}$ are determined by minimizing $E_j$ using the least-squares method.

Next, at step S55, the prediction value is calculated. Equation (6) or Equation (7) is used to calculate the prediction values from the prediction-source values. The matrix elements $m_{11}$, $m_{12}$, ... $m_{ij}$ calculated at step S54 are used to determine prediction output signals ($y'_{1j}$, $y'_{2j}$, $y'_{3j}$) where the prediction-source values are input signals ($x_{1j}$, $x_{2j}$, $x_{3j}$) or ($x_{1j}$, $x_{2j}$, $x_{3j}$, $x_{4j}$).

Next, at step S56, an evaluation is made as to whether the prediction operation is complete. In this operation, an evaluation is made as to whether calculation of predicted values for each prediction-source value has been completed. If calculations are not finished, control returns to step S53, where weight coefficients are calculated, and a prediction value is determined based on the next prediction-source value. If calculations are finished, the prediction of color transfer characteristics using only monotonically decreasing function $F_{ij}$ for a color image input/output device is completed.

As the description above demonstrates, weight coefficients may be determined when only the monotonically decreasing function $F_{ij}$ is to be used in determining a prediction output value from an arbitrary input signal. Thus prediction may be performed without using the method of successive approximations.

The following is a description of the fourth embodiment of the method for predicting color transfer characteristics according to the present invention. In this fourth embodiment, weight coefficient $W_{ij}$ in Equation (3) is calculated with monotonically decreasing function $F_{ij}$, of the first embodiment, and the data precision function $J_i$, of the second embodiment. Monotonically decreasing function $F_{ij}$ takes as its parameter a Euclidean distance in normalized input signal space based on input space difference components calculated from the differences between the components of the input signal, the prediction-source value, and the real input signal data. The differences are normalized by dividing each signal component by a constant.

Monotonically decreasing function $F_{ij}$, as described above, is identical to the monotonically decreasing function $F_{ij}$ from the first embodiment, as indicated in Equations (8) or (9), which takes as its parameter a Euclidean distance in normalized input signal space based on input space difference components calculated from the differences between the components of the input signal, the prediction-source value, and the real input signal data. The differences are normalized by dividing each signal component by a constant. Data precision function $J_i$ is identical to that shown in Equations (16) through (22) of the second embodiment.

This method for predicting color-transfer characteristics is almost identical to the method shown in FIG. 2 or FIG. 3 except that when a predicted input signal is to be determined from an arbitrary output signal, the prediction-source value, monotonically decreasing function $F_{ij}$ is dependent on the prediction value. Thus, in these cases, $W_{1ij}$, shown in Equations (8) or (9), is used for weight coefficient $W_{ij}$ in Equation (3) instead of $W_{12ij}$ in Equation (12). The following description therefore covers cases where an arbitrary input signal, the prediction-source value, is used to determine a predicted output signal value.

Figure 5:
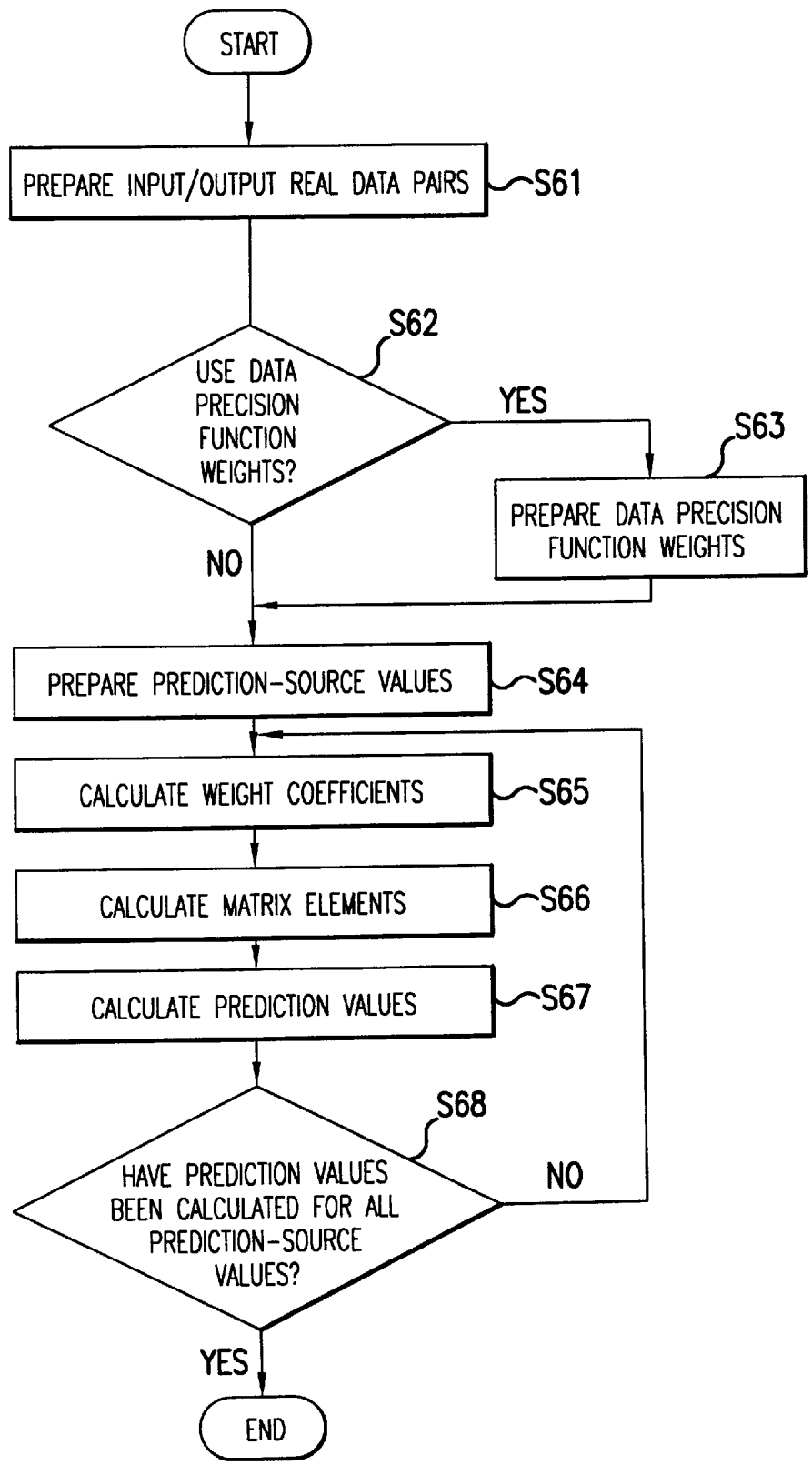
FIG. 5 is a flowchart of the fourth embodiment of a method for predicting color transfer characteristics according to the present invention, when an arbitrary input signal (the prediction-source value) is used to determine an output signal (prediction value)
Figure 6:
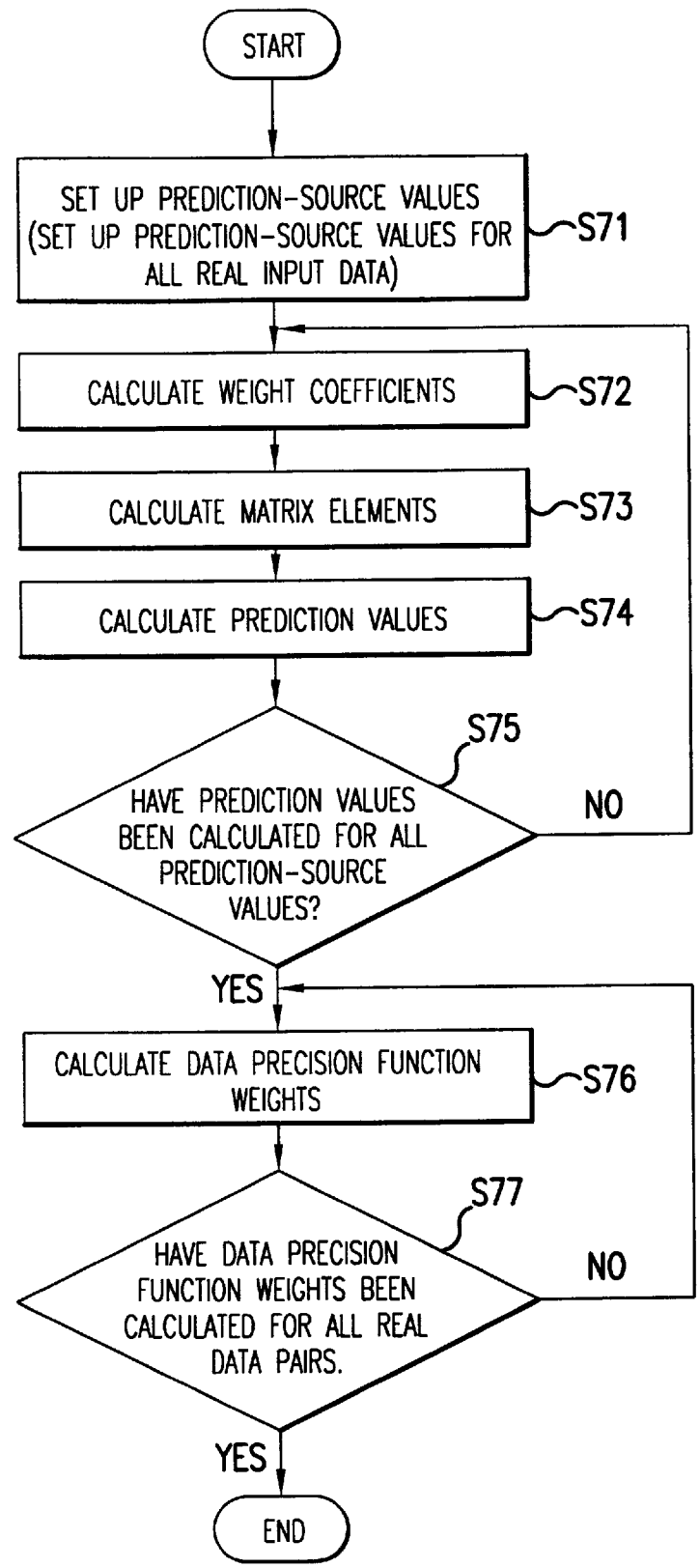
FIG. 6 is a flowchart of a method for preparing the data precision function in the fourth embodiment of a method for predicting color transfer characteristics according to the present invention.

FIG. 5 is a flowchart of the fourth embodiment of a method for predicting color transfer characteristics according to the present invention. In this example, an arbitrary input signal, the prediction-source value, is used to determine a corresponding predicted output signal value. FIG. 6 is a flowchart detailing the preparation of the data precision function. In this example, the data precision function may be used selectively. If the data precision function is not selected, operations are identical to those of the third embodiment. First, at step S61, the real input and output data pairs are prepared, identical to that of the real input and output data preparation operation in step S11 shown in FIG. 1.

Next, at step S62, a decision is made as to whether to use data precision function weighting. If data precision function weighting is not to be used, control proceeds to step S64 and the operations described in the third embodiment are performed. If weighting coefficients based on the data precision function are to be used, control proceeds to a S63, where data precision function weighting is prepared. The description below will refer to FIG. 6, which illustrates how the data precision function weighting is prepared.

At step S71, the prediction-source values are established. All the real input and output data prepared in the real input and output data pair preparation operation at step S61 in FIG. 5 are established as prediction-source values, and preparations are made for the prediction of output values from the real input and output data to be performed starting with step S72.

Next, at step S72, the weight coefficients are determined by calculating the n sets of weight coefficients $W_{ij}$ referred to in Equation (3). Weight coefficients may be determined since the prediction-source values are input signals, as required in monotonically decreasing function $F_{ij}$ shown in Equations (8) or (9). The parameter of monotonically decreasing function $F_{ij}$ is a Euclidean distance in normalized input signal space determined from input space difference components based on the differences calculated between the components of the input signal, the prediction-source value, and the real input signal data, where normalization is performed by dividing the differences by a constant.

Next, at step S73, the elements of the matrix are calculated. The well-known least-squares method is used to recalculate elements $m_{11}$, $m_{12}$, ... $m_{ij}$ so that $E_j$ is minimized. As shown in Equation (3), weighted Euclidean distances between the predicted output values, determined from the plurality of real input signal data using the matrix, and the corresponding plurality of real output data are taken. $E_j$ is the sum of the squares of these weighted Euclidean distances. The weight coefficient used is determined by the weight coefficient calculations performed at step S72.

Next, at step S74, Equations (6) or (7) is used to calculate a prediction value from the prediction-source value. Since the prediction-source value is input signal ($x_{1j}$, $x_{2j}$, $x_{3j}$), the matrix elements $m_{11}$, $m_{12}$, ... $m_{ij}$ calculated at step S73 are used to determine a prediction output signal ($y'_{1j}$, $y'_{2j}$, $y'_{3j}$).

Next, at step S75, a determination is made as to whether prediction values have been calculated for all the prediction-source values. If calculations are not complete, control returns to step S72, where weight coefficient calculations are performed, and prediction values are determined for the next prediction-source value. If calculations are complete, control proceeds to step S76, where the data precision function weights are calculated.

At step S76, the data precision function weights are calculated based on the data precision function shown in Equations (16) through (19). The data precision function indicates the reliability of the real data pairs. The data precision function uses the direction and size of the difference between the predicted output value for the real data pair being considered and the corresponding real output data being considered. The data precision function also uses the direction and size of the weighted average difference between the predicted output value for real data pairs, excluding the real data pair under consideration, and the real output data. If the two have the same direction, the data precision function returns large values for large differences. If the two have different directions, the data precision function returns small values for large differences.

Next, at step S77, a determination is made as to whether data precision function weight calculations have been performed for all input and output real data pairs. If calculations have not been completed, control returns to step S76, where data precision function calculations are performed, and the data precision function weights for the next input and output real data pair are calculated. If calculations have been completed, control proceeds to step S64 in FIG. 5, where prediction-source values are prepared.

The operations performed from step S64 through step S68 in FIG. 5 are almost identical whether or not data precision function weights are used, the only difference being at step S64.

In step S64, n sets of weight coefficients $W_{ij}$, as shown in Equation (3), are calculated. Since, in this case, the prediction-source value is the input signal, the weight coefficient may be determined by using a composite function of the data precision function weight, shown in Equation (24), and a monotonically decreasing function. The monotonically decreasing function, as shown in Equations (8) or (9), takes as its parameter a Euclidean distance in normalized input signal space determined from input space difference components based on the differences calculated between the components of the input signal, the prediction-source value, and the real input signal data.

The steps other than step S64 in FIG. 5 are identical whether or not data precision function weights are used. By performing the prediction operations in step S61 through step S68, it is possible to calculate prediction values with data precision function weighting. As the description above shows, even when data precision function weights are used, weight coefficients may be determined if an input signal, the prediction-source value, is used to calculate a prediction value using only a monotonically decreasing function $F_{ij}$. Thus, in such cases, prediction may be performed without using the method of successive approximations.

In the descriptions above, four embodiments of the present invention were presented. In addition, it also is possible to combine the method for predicting color transfer characteristics shown in FIG. 2 with the data precision function shown in FIG. 6, but this combination may be derived easily so its description is omitted.

EXAMPLE 1

Figure 7:
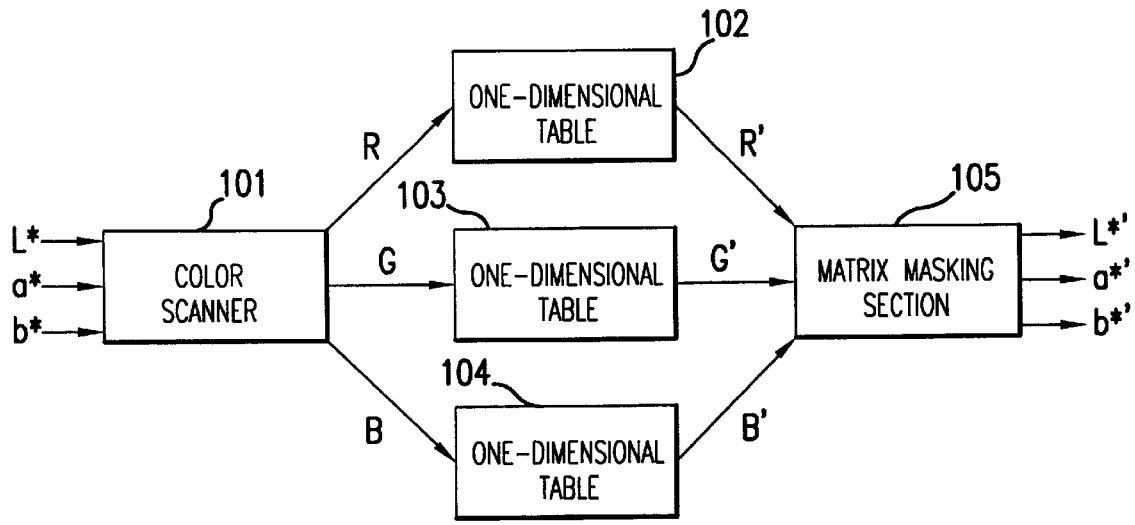
FIG. 7 is a schematic of a system in which a method for predicting color transfer characteristics of the present invention may be implemented.

FIG. 7 shows a first example of a system that implements a method for predicting color transfer characteristics according to the present invention. The system provides color scanner 101 1-dimensional tables 102–104, and a matrix masking section 105. Color scanner 101 is the color image input device. The following describes determination of color-processing coefficients using a method for predicting color transfer characteristics according to the present invention, and calculation of the accuracy of the processing.

In the system shown in FIG. 7, color scanner 101 reads in a given color image and outputs an RGB color space signal. One-dimensional tables 102–104 take the individual signal components of the RGB color space signal output from color scanner 101 and perform color adjustments. The objective of one-dimensional tables 102–104 is to take the RGB color space data, which generally is proportional to reflectivity, and convert it into different units not based on reflectivity, e.g., R'G'B' having units based on chromaticness and lightness. This conversion improves conversion accuracy when the data later is converted by matrix masking section 105 into L*a*b color space data. Another objective of one-dimensional tables 102–104 is to correct the data so that when a gray color is input into color scanner 101, the R', G' and B' values are the same. This compensates for differences in sensitivity in the RGB sensors of color scanner 101. After one-dimensional tables 102–104 converts the R, G and B components, matrix masking section 105 converts the result into uniform perceptual color space L*a*b, which is device-independent. At this point, a color image scanned in by color scanner 101 and real L*a*b uniform perceptual color space data is obtained by measuring the color image using a colorimeter or the like. The L*'a*'b*' color space data output from matrix masking section 105 is adjusted to match the real data. This makes it possible to input color image data that can be reproduced faithfully based on the color image provided to color scanner 101.

Figure 8:
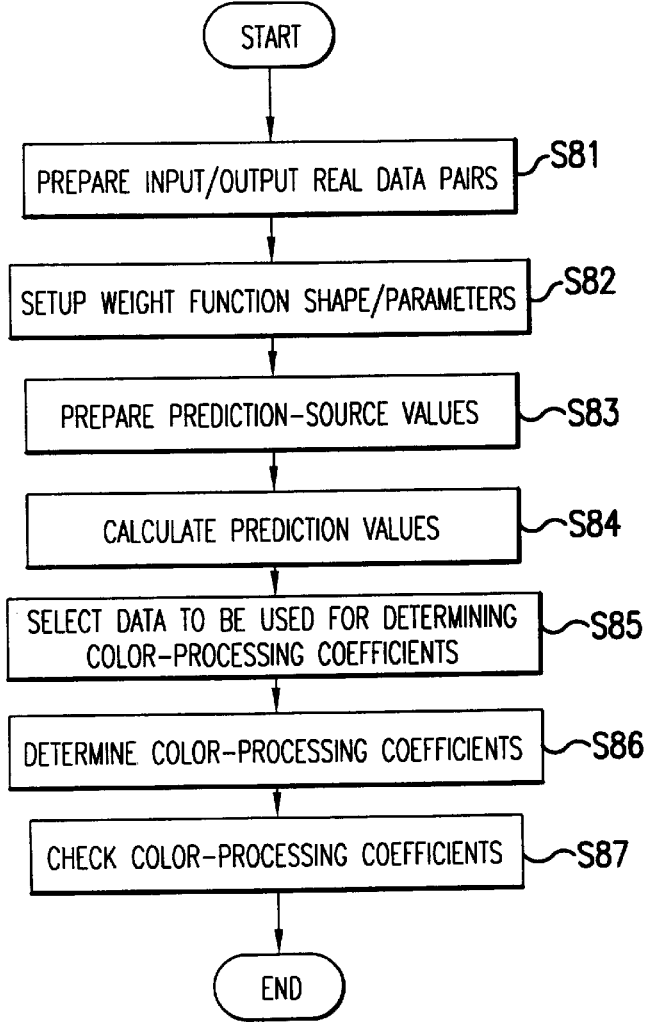
FIG. 8 is a flowchart of a method for checking the determination of color-processing coefficients in the first example of a system conducting a method for predicting color transfer characteristics according to the present invention.

FIG. 8 is a flowchart showing how color-processing coefficients may be determined and confirmed with the system in the first example in which the method for predicting color transfer characteristics of the present invention is implemented. In this case, the prediction of color-transfer characteristics is based on the first embodiment, in which data precision functions are not used.

First, at step S81, the real input and output data pairs are prepared. Various color patches are scanned into color scanner 101. The colors of the color patches are measured beforehand to provide uniform perceptual color space L*a*b* data. The RGB color space signal output from color scanner 101 is measured. This provides a real data pair including uniform perceptual color space L*a*b* data, the real input signal data, and real RGB color space data output from color scanner 101 . It is desirable for the various color patch colors to be distributed evenly across the input color space. The number of patches to be used depends on how accurate a prediction the user desires, but generally about 100 to 1000 should be used.

When a color image is scanned in, the output signal contains noise due to unevenness in the color scanner, nonuniformity, unstability and the like. Measures should be taken to remove this type of noise with the smoothing feature provided in the color-characteristic measurement method. Also, when the color patches are being scanned in, it is desirable to order them randomly so that nonuniformity may be distributed randomly in the RGB color space. Also, it is desirable to divide up the scanning in batches when collecting RGB color space data so that the effects of temporal unstability may distributed evenly across the RGB values. Furthermore, it also is desirable to take the nonuniformity of the color patches themselves into account by making sure that aperture size is not too small during color measurement and measuring the RGB color space data by taking an average over an area having a size corresponding to the aperture size.

Next, at step S82, the shape and parameters are set up for the weighting function used in predicting color-transfer characteristics. For example, the weighting functions corresponding to the functions in Equations (8), (10) and (12) are set up according to Equations (27) through (29). Here, ($L_j$, $a_j$, $b_j$) is the input signal, including either the prediction-source value or the prediction value. ($L_i$, $a_i$, $b_i$) is the real input signal data. ($L_0$, $a_0$, $b_0$) is the normalization constant for the input signal space. ($R_0$, $G_0$, $B_0$) is the normalization constant for the output signal space and p is the constant used to determine function shape.

The weight parameters are the three constants ($L_0$, $a_0$, $b_0$), ($R_0$, $G_0$, $B_0$) and p, which adjust the degree of smoothing performed. Larger values of ($L_0$, $a_0$, $b_0$) and ($R_0$, $G_0$, $B_0$) result in greater smoothing, while larger values of p result in less smoothing. These parameters must be set up according to the degree of noise present in the real input and output data pairs before predictions are performed. In general, if the amount of noise is high, more smoothing should be used, and if the amount of noise is low, less smoothing should be used. However, the degree of noise present may be determined only based on the input and output real data pairs, for which true values are not known. Thus, to some degree, these settings are based on experience.

For example, a set of preliminary parameters may be set up to predict output from real input data. Then, the difference between the predicted value and the real output data may be observed to select an appropriate set of parameters. In this case, the difference between the predicted value and the real output data is a composite of the errors resulting from the prediction method itself and the errors introduced by noise. The relationship between this difference and the optimal parameter set may be determined beforehand with simulations or the like.

In another example, it is possible to prepare prediction-source values based on a gradation in the L*a*b* color space, e.g. prediction-source values where a*=b*=0 and L* changes gradually. A set of preliminary parameters is established and RGB color space data is predicted. Then, the predicted RGB color space data is graphed relative to L*. The shape of the graph is used to determine whether the preliminary parameter set is acceptable. For example, if the results track the real data pairs too much, there will be many unnatural extreme points. In this case, smoothing is too weak, thus an appropriate parameter should be established that provides stronger smoothing, and a similar evaluation is performed again. By repeating this type of operation a number of times, an optimal parameter set may be determined.

Next, at step S83, a plurality of prediction-source values are prepared for determining color-processing coefficients. Establishing prediction-source values is dependent on the color-processing algorithm to be used and the method for determining coefficients. Here, coefficients for one-dimensional tables 102–104 are determined beforehand, then the coefficients for matrix masking section 105 are established. In this case, the coefficients for one-dimensional tables 102–104 are determined by setting up prediction-source values according to a grayscale, i.e. prediction-source values where a*=b*=0 and L* vary uniformly from 0 to 100. If, for example, an eight-bit table is to be used, a step width of about 100/256 is sufficient. If color differences are to be small uniformly across the color space, the coefficients for matrix masking section 105 may be determined using L*a*b lattice points as prediction-source value data, e.g. lattice points at intervals of 10. If color differences are to be minimized for particular colors, such as skin colors, these colors may be added as well.

Next, at step S84, the prediction values are calculated. Prediction is performed for the plurality of prediction-source values set up at step S83. The method used here is identical to the method described for FIG. 1. As a result, prediction values in RGB color space are obtained from gray scale and L*a*b lattice point data.

Next, at step S85, data is selected for determining color-processing coefficients. In this operation, the data pairs required for determining the color-processing coefficients are selected from the plurality of prediction-source values and predicted values provided by step S84. Selection is based on whether the predicted RGB color space values lie within the range handled by the color-processor of the system. In other words, RGB color space data may be represented generally in terms of reflectivity, but it is possible for the RGB color space values predicted from gray scale and L*a*b* lattice point data to be less than 0 or greater than 100%. Since these data are not necessary for the determination of color-processing coefficients, they are eliminated and only the data pairs having predicted values within the range of 0 and 100% in the RGB color space are selected.

Next, at step S86, the actual coefficients to be used in color processing are determined. First, the gray scale data is used to determine the coefficients in one-dimensional tables 102–104. One-dimensional tables 102–104 convert RGB color space data, based on reflectivity, into R'G'B'color space data, based on lightness. The coefficients in one-dimensional tables 102–104 for the separate R, G and B components may be determined by plotting a graph of the gray scale data where the horizontal coordinates are the predicted R, G or B values and the vertical coordinates are the L* values. The values between the plotted points may be approximated with lines and a conversion function from RGB color space into R'G'B' color space determined. The coefficients for one-dimensional tables 102–104 may be determined by quantizing this conversion function.

Next, the coefficients for matrix masking section 105 are determined using L*a*b* lattice point data. One-dimensional tables 102–104, set up previously, are used to convert the predicted RGB color space values corresponding to the L*a*b* lattice point data into R'G'B' color space data. The R'G'B' color space data is sent to matrix masking section 105. Matrix masking section 105 determines its coefficients by performing recursive least-squares calculations with the L*a*b* color space data from the scanned color image as the target output.

Finally, at step S87, the accuracy of the color processing coefficients is checked by comparing the L*a*b* color space data to be checked with the L*'a*'b*' color space data resulting from color processing. Thus, the L*a*b* color space data for an arbitrary color to be checked is used as a prediction-source value to predict RGB color space data output from color scanner 101. This prediction value is converted into R'G'B' color space data using one-dimensional tables 102–104, then is converted again into L*'a*'b*' color space data using matrix masking section 105. The color difference between the resulting data and the L*a*b* color space data then may be checked. A similar operation may be performed with arbitrary RGB color space data. In this case, the arbitrary RGB color space data is established as the prediction-source value and L*a*b* color space data for the color image given to color scanner 101 is predicted. One-dimensional tables 102–104 and matrix masking section 105 convert the RGB color space data into L*'a*'b*' data and a color difference between the result and the original L*a*b* data may be determined.

EXAMPLE 2

Figure 9:
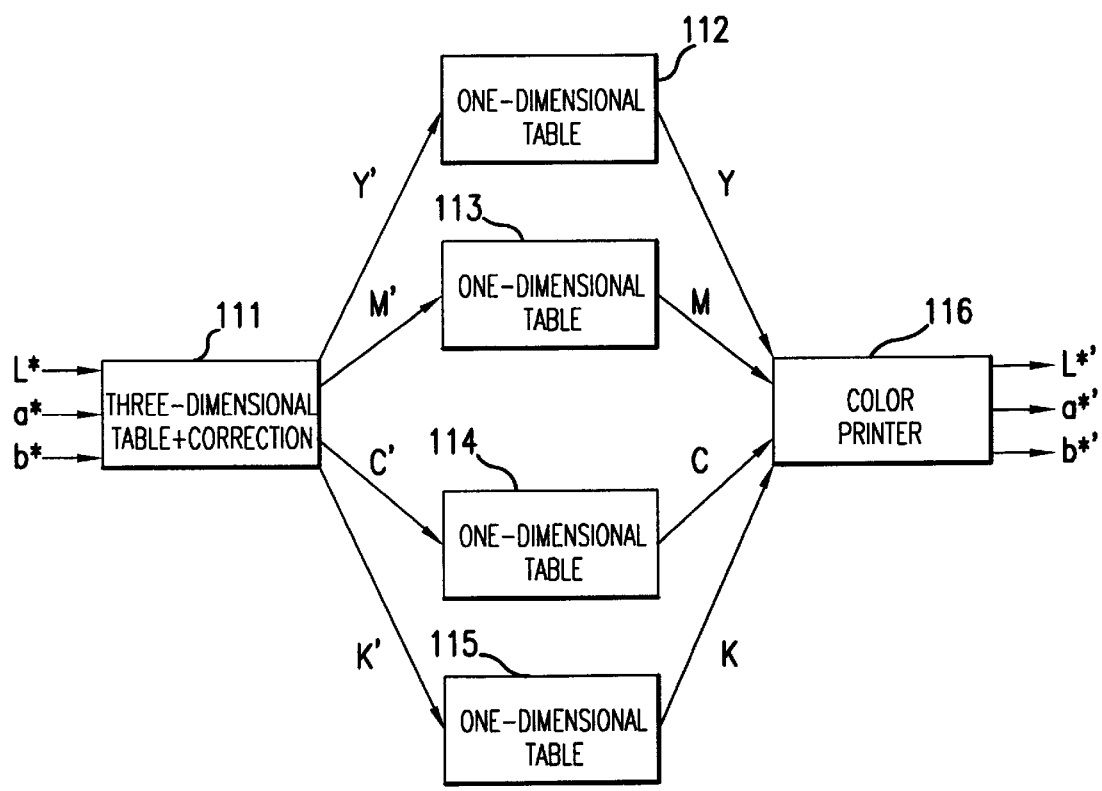
FIG. 9 is a schematic of a system in which a method for predicting color transfer characteristics of the present invention may be implemented.

FIG. 9 shows a second system in which the method for predicting color transfer characteristics according to the present invention is implemented. The figure shows a three-dimensional table 111, one-dimensional tables 112–115 and a color printer 116. In this example, color printer 116 is the color image output device. The following describes how, with a method for predicting color transfer characteristics according to the present invention, color-processing coefficients are determined and how the accuracy of the processing may be checked.

In the system shown in FIG. 9, the color image data to be recorded is provided to three-dimensional table 111 as L*'a*'b*' color space data. Three-dimensional table 111 takes the L*'a*'b*' color space data and converts it into y'M°C'K' four-dimensional color-space data. In this conversion operation, colors not provided in the table are interpolated.

Conversion should be performed so that the L*'a*'b*' color space input data and the L*a*b* color space data from the color image recorded by color printer 116 match each other as much as possible.

The Y'M'C'K' color space data output from three-dimensional table 111 is sent as individual components to one-dimensional tables 112–115. Each table in one-dimensional tables 112–115 makes adjustments on the components and sends the output to color printer 116 as YMCK color space data. The objective of one-dimensional tables 112–115 is to perform correction on localized single-color scale non-linearities that may not be handled by three-dimensional table 111.

Color printer 116 receives the YMCK color space data output as separate components from one-dimensional tables 112–115, and records the data as a color image on a recording medium. A faithful reproduction of the given color image data may be output as a color image output by establishing coefficients of three-dimensional table 111 and one-dimensional table 112 so that the L*a*b* color space values of the recorded color image match the L*'a*'b*' color space values of the color image data sent to three-dimensional table 111.

Figure 10:
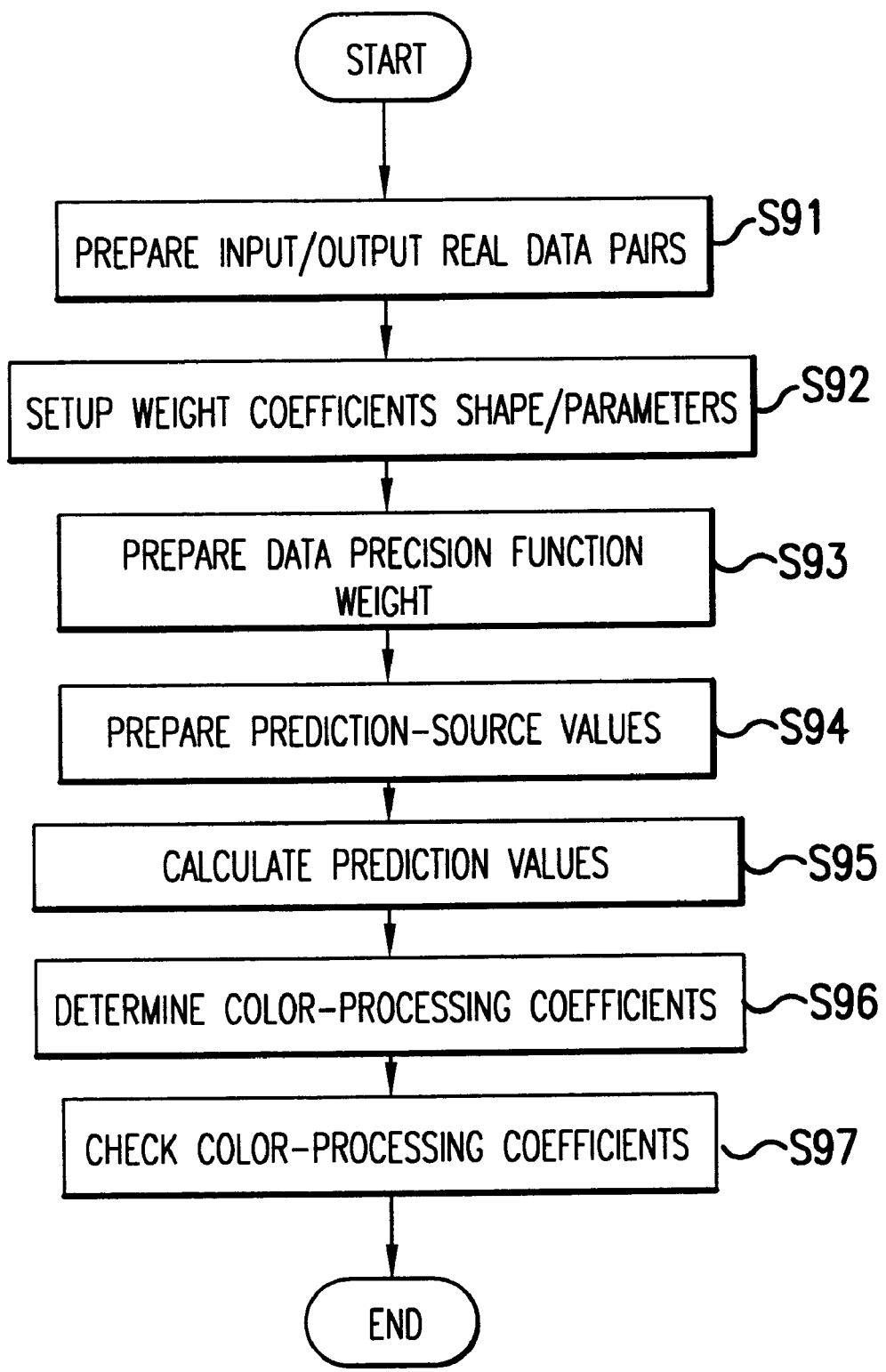
FIG. 10 is a flowchart of a method for checking the determination of color-processing coefficients in the second example of a system conducting a method for predicting color transfer characteristics according to the present invention.

FIG. 10 shows a flowchart indicating one example of how the color-processing coefficients may be determined then checked with a second system in which a method for predicting color transfer characteristics of the present invention is implemented. The prediction method used here involves the data precision function described in the second embodiment.

First, at step S91, color patches are output using various combinations of YMCK color space data. These colors are measured to prepare real data pairs including YMCK color space input data and L*a*b* color space output data. As with the color image input device described above, it is desirable to have the various color patch colors distributed evenly across the input color space. For example, it would be ideal to output color patches using all combinations of 10% YMCK steps. However, this would result in too many patches. Therefore, it is more practical to output between approximately 100 and 1000 patches. The total sample pool may be thinned out by using an orthogonal table.

Alternatively, it is possible to remove regions where changes in the YMCK color space input data correspond to minimal changes in the L*a*b* color space output data. Conversely, areas where the color-transfer characteristics of color printer 116 change rapidly could be adjusted to correspond to a finer interval for outputting patches. When color patches are output, the output signal may contain noise due to unevenness in the printer, nonuniformity, unstability and the like. Measures should be taken to remove this type of noise with the smoothing feature provided in the color-characteristic measurement method. Also, measures should be taken to handle nonuniformity in the color patches themselves. The methods involved here are identical to those described in the context of color image input devices described above.

Next, at step S92, the shape and parameters are determined for the weighting function used in predicting color-transfer characteristics. For example, the weighting functions corresponding to the functions in Equations (9), (11) and (16) through (23) are determined according to Equations (30) through (39). Here, $(Y_j, M_j, C_j, K_j)$ is the input signal including either the prediction-source value or the prediction value. $(Y_i, M_i, C_i, K_i)$ is the real input signal data. $(Y_0, M_0, C_0, K_0)$ is the normalization constant for the input signal space. $(L_j, a_j, b_j)$ is the output signal including either the prediction-source value or the prediction value. $(L_i, a_i, b_i)$ is the real output signal data, $(L_0, a_0, b_0)$ is the normalization constant for the output signal space and p is the constant used to determine function shape.

The weight parameters are the three constants $(Y_0, M_0, C_0, K_0)$, $(L_0, a_0, b_0)$ and p, which adjust the degree of smoothing performed. Larger values of $(Y_0, M_0, C_0, K_0)$ and $(L_0, a_0, b_0)$ result in greater smoothing, while larger values of p result in less smoothing. These parameters must be established according to the degree of noise present in the real input and output data pairs before predictions are performed. The method for establishing the parameters is the same as the method used in the color image input device described above.

Next, at step S93, the data precision function weighting is prepared. The weights corresponding to Equation (16) through Equation (23), weights $W_{123ij}$ from Equation (32) through Equation (39), are calculated. The method used for the calculations is identical to the method described in FIG. 3. This operation results in data precision function weights being determined for all the real input and output data pairs.

Next, at step S94, a plurality of prediction-source values are established to determine color-processing coefficients. The settings for the prediction-source values are dependent on the color-processing algorithm used and coefficients used in the algorithm. In this case, the coefficients for one-dimensional tables 112–115 are determined first, then the coefficients for three-dimensional table 111 are determined. The coefficients for one-dimensional tables 112–115 are determined with single-color color scales, scales in which M=C=K=0% and Y varies uniformly from 0 to 100%, M varies uniformly from 0 to 100%, C varies uniformly from 0 to 100%, and K varies uniformly from 0 to 100%, as prediction-source values. If eight-bit tables are used, step widths for the color scales of 100/256 should be sufficient.

To determine the coefficients for three-dimensional table 111, the L*a*b* color space data corresponding to the lattice points of the table and the K percentage value of the corresponding color are used as prediction-source values. Various methods have been proposed as to how to establish the percentage value for K, such as using the maximum ink volume. It also would be possible to make a determination based on the prediction method of the present invention.

Next, at step S95, prediction values are determined for the plurality of prediction-source values established at step S94. The prediction method is identical to the method shown in FIG. 2. The prediction operation results in prediction values in the L*a*b* color space based on the single-color scales, the prediction-source values, and prediction values in the YMC color space based on the L*a*b* color space lattice point and K percentage data.

Next, at step S96, the coefficients for the actual color-processing device are determined. First, the coefficients for one-dimensional tables 112–115 are determined using data from the single-color scales. A graph of the single-color scale data pairs is plotted, where the horizontal coordinate is the color difference values for zero chromaticity calculated using the L*a*b* space values predicted from the single-color scales, and the vertical coordinate is the Y, M, C or K percentage value. The intervals between plotted points are approximated with straight lines to determine the conversion function from the Y'M'C'K' color space to the YMCK color space. The coefficients for one-dimensional tables 112–115 may be determined by quantizing the conversion function.

Next, the three-dimensional table 111 coefficients are determined using L*a*b* color space data corresponding to the lattice points in three-dimensional table 111. To do this, the data corresponding to the lattice points of three-dimensional table 111, the percentage values in YMCK determined through prediction, and the K percentage values that have been determined are converted to Y'M'C'K' color space data by reversing one-dimensional tables 112–115. The values then are used as the coefficients for the corresponding lattice points.

This basic method may be used when the L*'a*'b*' color space data of the lattice points are within the color range that is reproduced by color printer 116. If it is possible for input data outside this color range to be entered into the system, the method must be expanded. This may be achieved by, for example, instead of setting up one-dimensional tables 112–115 for 0–100%, extrapolation could be used to set up one-dimensional tables 112–115 for the entire range of L*'a*'b*' values for the lattice points of three-dimensional table 111. By determining coefficients this way, the Y'M'C'K' color space data that is greater than 100%, i.e., the data Y'M'C'K' color space data that is outside the color range, may be determined. Then, in order to fit the values in a range of 0–100%, it is possible to use the technique generally known as gamut compression to determine the final lattice point coefficients.

Finally, at step S97, the accuracy of the color processing coefficients is checked by comparing L*a*b* color space data used as the color-processing input with the L*'a*'b*' color space data output from color printer 116. Thus, the L*'a*'b*' color space data for an arbitrary color to be checked is converted into Y'M'C'K' color space data using three-dimensional table 111, and the values then are converted into YMCK color space data using one-dimensional tables 112–115. The YMCK color space data is used as prediction-source values to predict the L*a*b* color space data to be output from color printer 116. The color difference between the prediction value and the L*'a*'b*' color space input data then may be determined.

Referring to FIGS. 7 and 8 again, the following describes when one-dimensional data is used as the prediction-source values and the third embodiment of the present invention is implemented. As described above, FIG. 7 shows the color processing that is performed for a color scanner input device. Determination of the coefficients for the one-dimensional tables 102–104 and matrix masking section 105 was described above. In this example, these coefficients have already been determined once. The following description applies to cases where only the coefficients of one-dimensional tables 102–104 need to be reset quickly due to changes color-transfer characteristics of the color scanner input device caused by changes over time in the light source or the CCD of the color scanner input device.

FIG. 8 shows how to determine color processing coefficients without using data precision functions. First, at step S81, real input and output data pairs are prepared. Gray scale patches for which brightness values have been measured are scanned in and the output RGB color space signals are measured. Real data pairs, including brightness L*, the real input signal data, and the real output signal data in the RGB color space are prepared. The intervals used in the gray scales depend on the precision desired for predictions. The numbers may be significantly smaller compared to cases where coefficients for matrix masking section 105 need to be determined as well. When the patches are scanned, the output signal may contain noise due to unevenness in the color scanner, nonuniformity, unstability and the like. Measures should be taken to remove this type of noise with the smoothing feature provided in the color-characteristic measurement method. Also, measures should be taken to handle unevenness in the gray scale patches themselves. These measures may include the same as those described previously.

At step S82, the shape and parameters are established for the weighting function used in predicting color-transfer characteristics. In this case, the input is lightness, so the weight function corresponding to the one in Equation (8) should be determined according to Equation (40). ($L_j$) is the input signal including the prediction-source value, ($L_i$) is the real input signal data, ($L_0$) is the normalization constant for the input signal space and p is the constant that determines function shape.

The weight parameters include ($L_0$) and p. These parameters may be used to adjust the degree of smoothing to be performed, as described previously. In this example, the coefficients for one-dimensional tables 102–104 and matrix masking section 105 already have been determined once, so these weight parameters may be established using these original parameters as references.

Next, at step S83, a plurality of prediction-source values are established to determine the coefficients of one-dimensional tables 102–104. In this example, gray scales, for example, data where brightness L* varies uniformly from 0 to 100, are used as prediction-source values. For eight-bit tables, a step width of about 100/256 should be sufficient.

Next, at step S84, predictions are made based on the plurality of prediction-source values set up in the previous step. The method for making the predictions is identical to the operations performed in step S51 through step S56 in FIG. 4, apart from the difference in the number of dimensions in the input data. These prediction operations provide prediction values in RGB color space that correspond to the gray scale data, the prediction-source values.

Next, at step S85, the data necessary for determining color-processing coefficients is selected out of the plurality of data pairs, including prediction-source values and prediction values, obtained in the previous step. The selection depends upon whether or not the predicted values in the RGB color space fall within the range handled by the color-processing device. In other words, RGB color space data generally is represented in units of reflectivity, but the predicted values for gray scale data in RGB color space may contain data that is greater than 100%. Since such data is not needed for determining color-processing coefficients, they are eliminated, and only the data pairs having RGB color space prediction values that fall within the 0 to 100% range are selected.

Next, at step S86, the actual coefficients for the one-dimensional table are determined. A first objective of one-dimensional tables 102–104 is to convert the RGB color space data, which generally is proportional to reflectivity, into R'G'B' color space data, based on factors other than reflectivity, such as concentration or brightness. This conversion may provide improved accuracy when the data subsequently is converted into L*a*b* color space data with matrix masking section 105. A second objective of one-dimensional tables 102–104 is to provide corrections for variations in sensitivity among the R, G and B sensors and to convert data so that when gray is input into the scanner, the data in the R'G'B' color space have the same values. In this example, conversion is performed according to brightness. The coefficients in one-dimensional tables 102–104 corresponding to R, G and B are determined by plotting the gray scale data pairs with the horizontal coordinate being the predicted R, G or B value and the vertical coordinate being the brightness L* value. The intervals between the plotted points are approximated with straight lines to determine a conversion function from RGB color space to R'G'B' color space. This conversion function is quantized to determine the coefficients for one-dimensional tables 102–104.

Finally, at step S87, the accuracy of the color-processing coefficients is checked by comparing an arbitrary brightness L*, the gray scale scanner input to be checked, with the L*a*b* color space data after color processing. Thus, the gray scale L* to be checked is used as the prediction-source value and a predicted scanner output data in the RGB color space is calculated. This data is converted into R'G'B' color space data using one-dimensional tables 102–104 then is converted into L*a*b* color space data using matrix masking section 105. The resulting value may then be checked against lightness L*.

As described above, the method for predicting color transfer characteristics according to the present invention also may be used in cases where it is necessary to redetermine the coefficients only for a one-dimensional table, the coefficients being established with a small number of data pairs.

In the description of this last embodiment, data precision functions were not used. It would be possible to use data precision functions where the coefficients for the one-dimensional table are redetermined by following the operations shown in FIG. 10. Also, it should be noted that, for printers, prediction is performed in reverse.

In the description above, the input signal was used as the prediction-source value, the output signal was used as the prediction value and prediction was performed using only weight coefficient $W_{1ij}$ shown in Equation (40). However, it also would be possible to use the output signal as the prediction-source value and the input signal as the prediction-source value. Alternatively, the output signal and a section of the input signal may be used as the prediction-source value and the remainder of the input signal used as the prediction value, as in the case with the color printer shown in FIG. 9. In these cases prediction values may be calculated with only weight coefficient $W_{1ij}$ if the method of successive approximations described earlier is used. Also, data precision functions may be used as well.

The method for predicting color transfer characteristics according to the present invention has many applications, such as the determination of color-processing coefficients for a color image input or output device, and the checking of the accuracy of the color-processing coefficients determined.

The present invention is not limited to the foregoing description, but encompasses all improvements and modifications falling within the scope of the following claims.

What is claimed is:

1. A method for predicting color transfer characteristics so that an output value can be predicted from a prediction-source value by using a real data pair comprising a plurality of real input signal data from a color image input device or a color image output device and corresponding output signal data, comprising the steps of:

setting up a relationship between said input signal and said output signal with a matrix so as to establish a linear combination containing a constant element;

determining differences, by signal component, between predicted output values determined using said matrix from said plurality of real input signal data and a plurality of corresponding real output data;

weighting said differences with a weight coefficient dependent on said prediction-source value;

determining the elements of said matrix so as to minimize the sum of the squares of said weighted differences; and determining a predicted output value from said prediction-source value using said matrix.

2. A method for predicting color transfer characteristics as described in claim 1 wherein: said weight coefficient comprises a monotonically decreasing function of a Euclidean distance in a normalized input signal space, said Euclidean distance being determined from difference components in the input space calculated by taking the difference, by signal component, between said prediction-source value and said real input signal data, and normalizing said difference by dividing said difference by a constant for each input signal component.

3. A method for predicting color transfer characteristics as described in claim 1 wherein: said weight coefficient is calculated from a data precision function based on the calculation between output values predicted beforehand from real input signal data and real output signal data, and from a monotonically decreasing function of a Euclidean distance in a normalized input signal space, said Euclidean distance being determined from difference components in the input space calculated by taking the difference, by signal component, between said prediction-source value and said real input signal data, and normalizing said difference by dividing said difference by a constant for each input signal component.

4. A method for predicting color transfer characteristics so that an output value can be predicted from a prediction-source value by using a real data pair comprising a plurality of real input signal data from a color image input device or a color image output device and corresponding output signal data, said method comprising the steps of:

setting up a relationship between said input signal and said output signal with a matrix so as to establish a relationship containing a constant element;

determining differences, by signal component, between predicted output values determined using said matrix from said plurality of real input signal data and a plurality of corresponding real output data;

weighting said differences with a weight coefficient dependent on said prediction-source value and said matrix elements; and determining the elements of said matrix, said weight coefficients, and the prediction values iteratively so as to minimize the sum of the squares of said weighted differences.

5. A method for predicting color transfer characteristics as described in claim 4 wherein: said weight coefficient is determined from:

a first monotonically decreasing function of a Euclidean distance in a normalized input signal space, said Euclidean distance being determined from difference components in the input space calculated by taking the difference, by signal component, between said prediction-source value and said real input signal data, and normalizing said difference by dividing said difference by a constant for each input signal component; and a second monotonically decreasing function of a Euclidean distance in a normalized input signal space, said Euclidean distance being determined from difference components in the input space calculated by taking the difference, by signal component, between said prediction-source value and said real input signal data, converting said difference into output space components adjusted for sensitivity using said matrix elements, and then normalizing said difference by dividing said difference by a constant for each input signal component for each input signal component.

6. A method for predicting color transfer characteristics as described in claim 4 wherein said weight coefficient is calculated from:

a first monotonically decreasing function of a Euclidean distance in a normalized input signal space, said Euclidean distance being determined from difference components in the input space calculated by taking the difference, by signal component, between said prediction-source value and said real input signal data, and normalizing said difference by dividing said difference by a constant for each input signal component;

a second monotonically decreasing function of a Euclidean distance in a normalized input signal space, said Euclidean distance being determined from difference components in the input space calculated by taking the difference, by signal component, between said prediction-source value and said real input signal data, converting said difference into output space components adjusted for sensitivity using said matrix elements, and then normalizing said difference by dividing said difference by a constant for each input signal component for each input signal component; and a data precision function calculated from the calculation between output values predicted beforehand from real input signal data and real output signal data.

7. A method for predicting color transfer characteristics to use a real data pair comprising a plurality of real input signal data from a color image input device or a color image output device and corresponding output signal data in order to determine a predicted input signal corresponding to a prediction-source value, or in order to use a part of the input signal and a prediction-source value to determine the remaining part of the predicted input signal, said method comprising the steps of:

setting up a relationship between said input signal and said output signal is set up with a matrix so as to establish a relationship containing a constant element;

determining differences, by signal component, between predicted output values determined using said matrix from said plurality of real input signal data and a plurality of corresponding real output data;

weighting said differences with a weight coefficient dependent at least on said prediction-source value; and determining the elements of said matrix and said weight coefficients iteratively so as to minimize the sum of the squares of said weighted differences.

8. A method for predicting color transfer characteristics as described in claim 7 wherein: said weight coefficient comprises a monotonically decreasing function of a Euclidean distance in a normalized input signal space, said Euclidean distance being determined from difference components in the input space calculated by taking the difference, by signal component, between said prediction-source value and said real input signal data, and normalizing said difference by dividing said difference by a constant for each input signal component.

9. A method for predicting color transfer characteristics as described in claim 7 wherein: said weight coefficient is calculated from a data precision function based on the calculation between output values predicted beforehand from real input signal data and real output signal data as well as from a monotonically decreasing function of a Euclidean distance in a normalized input signal space, said Euclidean distance being determined from difference components in the input space calculated by taking the difference, by signal component, between said prediction-source value and said real input signal data, and normalizing said difference by dividing said difference by a constant for each input signal component.

10. A method for predicting color transfer characteristics as described in claim 7 wherein said weight coefficient is calculated from:

a first monotonically decreasing function of a Euclidean distance in a normalized input signal space, said Euclidean distance being determined from difference components in the input space calculated by taking the difference, by signal component, between said prediction value and said real input signal data, and normalizing said difference by dividing said difference by a constant for each input signal component; and a second monotonically decreasing function of a Euclidean distance in a normalized input signal space, said Euclidean distance being determined from difference components in the input space calculated by taking the difference, by signal component, between said prediction value and said real input signal data, converting said difference into output space components adjusted for sensitivity using said matrix elements, and then normalizing said difference by dividing said difference by a constant for each input signal component for each input signal component.

11. A method for predicting color transfer characteristics as described in claim 7 wherein said weight coefficient is calculated from:

a first monotonically decreasing function of a Euclidean distance in a normalized input signal space, said Euclidean distance being determined from difference components in the input space calculated by taking the difference, by signal component, between said prediction value and said real input signal data, and normalizing said difference by dividing said difference by a constant for each input signal component;

a second monotonically decreasing function of a Euclidean distance in a normalized input signal space, said Euclidean distance being determined from difference components in the input space calculated by taking the difference, by signal component, between said prediction value and said real input signal data, converting said difference into output space components adjusted for sensitivity using said matrix elements, and then normalizing said difference by dividing said difference by a constant for each input signal component for each input signal component; and a data precision function calculated from the interrelation between output prediction values predicted beforehand from real input signal data and real output signal data.

12. A method for predicting color transfer characteristics comprising the steps of:

preparing real data, including corresponding real input and real output;

preparing a first prediction-source value;

calculating a first weight coefficient based on said real data and said prediction-source value;

calculating a first matrix element based on said weight coefficient and a difference between said real input and said real output;

calculating a prediction value based on said prediction-source value and said matrix element;

calculating a second weight coefficient based on said real data and said prediction-source value;

calculating a second matrix element based on said second weight coefficient and a difference between said first prediction value and said real data; and calculating a second prediction value based on said first prediction-source value and said second matrix element.

13. The method of claim 12, wherein at least one of said first prediction-source value and said second prediction-source value comprises at least one of said real input, said real output, said prediction value and arbitrary data.

14. The method of claim 12, wherein at least one of said first weight coefficient and said second weight coefficient also is based on at least one of said first matrix element and said second matrix element.

15. The method of claim 12, wherein at least one of said first weight coefficient and said second weight coefficient is determined with monotonically decreasing functions of normalized data comprising at least one of input data and output data.

16. The method of claim 12, wherein at least one of said first weight coefficient and said second weight coefficient is determined with a data precision function based on real output and one of said first prediction value and said second prediction value.

17. The method of claim 12, wherein at least one of said step of calculating said first matrix element and said step of calculating said second matrix element is a function of a sum of least squares of differences between at least one of said first prediction value and said second prediction value and an actual value.

18. The method of claim 17, wherein said sum is minimized.

19. The method of claim 12, further comprising the steps of:

comparing said first prediction value and said second prediction value;

determining whether said first prediction value and said second prediction value are converging; and, if so:

calculating a third weight coefficient;
calculating a third matrix element; and
calculating a third prediction value.

20. The method of claim 12, wherein said method accommodates multi-dimensional data.

* * * * *